US012681319B2

(12) United States Patent
Kim et al.

(10) Patent No.: US 12,681,319 B2
(45) Date of Patent: Jul. 14, 2026

(54) ELECTRONIC DEVICE AND METHOD FOR CONTROLLING THE ELECTRONIC DEVICE THEREOF

(71) Applicant: SAMSUNG ELECTRONICS CO., LTD., Suwon-si (KR)

(72) Inventors: Kyunghwan Kim, Suwon-si (KR); Jaesung Park, Suwon-si (KR); Daesun Oh, Suwon-si (KR); Jonghee Han, Suwon-si (KR); Woosung Chung, Suwon-si (KR); Hyunah Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 18/483,189

(22) Filed: Oct. 9, 2023

(65) Prior Publication Data

US 2024/0160029 A1    May 16, 2024

Related U.S. Application Data

(63) Continuation of application No. PCT/KR2023/012848, filed on Aug. 30, 2023.

(30) Foreign Application Priority Data

Nov. 11, 2022    (KR) ........................ 10-2022-0150325
Dec. 26, 2022    (KR) ........................ 10-2022-0184529

(51) Int. Cl.
  *G03B 21/28*        (2006.01)
  *G02B 5/04*         (2006.01)
  (Continued)

(52) U.S. Cl.
  CPC ............. *G02B 27/126* (2013.01); *G02B 5/04* (2013.01); *G02F 1/29* (2013.01); *H04N 9/317* (2013.01);
  (Continued)

(58) Field of Classification Search
  CPC .. H04N 9/3147; H04N 9/3188; H04N 9/3185; G02B 27/126; G02B 5/04; G03B 21/28
  (Continued)

(56) References Cited

U.S. PATENT DOCUMENTS

| | | |
|---|---|---|
| 7,667,825 B2 | 2/2010 | Inoue |
| 10,042,244 B2 | 8/2018 | Kim et al. |

(Continued)

FOREIGN PATENT DOCUMENTS

| | | |
|---|---|---|
| CN | 101750868 A | 6/2010 |
| JP | 2000-171896 A | 6/2000 |

(Continued)

OTHER PUBLICATIONS

Izumi et al., JP 2000-171896 Machine translation in English, Nov. 3, 2025 (Year: 2000).*

(Continued)

*Primary Examiner* — Ryan D Howard
(74) *Attorney, Agent, or Firm* — Nixon & Vanderhye P.C.

(57) ABSTRACT

Provided are an electronic device and/or a controlling method thereof. The electronic device may include a projection part; a memory storing at least one instruction; and at least one processor. The projection part may include a split prism for transmitting a part of light emitted from a light source in a front direction and reflecting a remaining part of light on at least one inclined surface in a lateral direction. The processor may be configured to convert an image corresponding to a received signal into a multi-sided image to be projected to a plurality of projection surfaces, and control the projection part to project the converted multi-sided image to the plurality of projection surfaces through the split prism.

19 Claims, 41 Drawing Sheets

360

(51) Int. Cl.

| | | |
|---|---|---|
| *G02B 27/12* | (2006.01) | |
| *G02F 1/29* | (2006.01) | |
| *H04N 9/31* | (2006.01) | |
| *G03B 21/00* | (2006.01) | |

(52) U.S. Cl.
CPC ......... *H04N 9/3185* (2013.01); *H04N 9/3188* (2013.01); *H04N 9/3194* (2013.01); *G03B 21/008* (2013.01)

(58) Field of Classification Search
USPC ..................................................... 353/34, 82
See application file for complete search history.

(56) References Cited

U.S. PATENT DOCUMENTS

| | | | |
|---|---|---|---|
| 11,303,866 B2 | 4/2022 | Sugiura | |
| 11,388,377 B2 | 7/2022 | Okuno et al. | |
| 11,624,971 B2 | 4/2023 | Nakagoshi | |
| 2005/0237492 A1 | 10/2005 | Shinozaki | |
| 2007/0008503 A1 | 1/2007 | Choi | |
| 2010/0103385 A1* | 4/2010 | Kubota | H04N 9/3194 |
| | | | 353/121 |
| 2010/0117929 A1 | 5/2010 | Fujimori | |
| 2010/0165297 A1* | 7/2010 | Mizushima | G03B 21/14 |
| | | | 353/30 |
| 2012/0147003 A1 | 6/2012 | Liu et al. | |
| 2012/0256879 A1 | 10/2012 | Liu et al. | |
| 2014/0104580 A1 | 4/2014 | Tsai et al. | |
| 2014/0211171 A1* | 7/2014 | Huang | H04N 9/3105 |
| | | | 353/34 |
| 2015/0296191 A1 | 10/2015 | Kim et al. | |
| 2019/0166336 A1* | 5/2019 | Shindo | H04N 7/0125 |

FOREIGN PATENT DOCUMENTS

| | | |
|---|---|---|
| JP | 2006-126480 A | 5/2006 |
| JP | 2008-046314 A | 2/2008 |
| JP | 2010134396 A | 6/2010 |
| JP | 2019-213051 A | 12/2019 |
| JP | WO2020137174 A1 | 7/2020 |
| JP | 2021105656 A | 7/2021 |
| JP | 2021-164100 A | 10/2021 |
| KR | 20-0378727 Y1 | 3/2005 |
| KR | 10-2007-0007689 A | 1/2007 |
| KR | 10-2014-0010884 A | 1/2014 |
| KR | 20140010877 A | 1/2014 |
| KR | 20160031869 A | 3/2016 |
| KR | 20170030926 A | 3/2017 |

OTHER PUBLICATIONS

Extended European Search Report dated Jul. 28, 2025 for EP Application No. 23888882.0.
PCT International Search Report dated Dec. 12, 2023 for PCT/KR2023/012848.
PCT Written Opinion dated Dec. 12, 2023 for PCT/KR2023/012848.

* cited by examiner

| LEFT REGION | FRONT REGION | RIGHT REGION |

1310-1

1310-2

1630-1    1630-2    1630-3

1640-1    1640-2    1640-3

ELECTRONIC DEVICE AND METHOD FOR CONTROLLING THE ELECTRONIC DEVICE THEREOF

CROSS-REFERENCE TO RELATED APPLICATION(S)

This application is a continuation of International Application PCT/KR2023/012848, filed on Aug. 30, 2023, which is based on and claims priority on KR Patent Application No. 10-2022-0150325 filed on Nov. 11, 2022, and KR Patent Application No. 10-2022-0184529 filed on Dec. 26, 2022, the disclosures of which are all hereby incorporated herein by reference in their entireties.

BACKGROUND

1. Field

Example apparatuses and/or methods relate to an electronic device and/or a controlling method thereof, and for example, to an electronic device which may project an image on a plurality of projection surfaces by using at least a projection part including a prism, and/or a controlling method thereof

2. Description of Related Art

In recent years, various projectors have been used in accordance with the development of electronic technology and optical technology. A projector is an electronic device projecting light to a screen (or a projection surface) to form an image on the screen.

An electronic device such as a conventional projection device may provide the image by projecting light to one projection surface. Even in case that light is projected to the plurality of projection surfaces, the image projected from the electronic device may be distorted due to an interface between the projection surfaces, an angle between the projection surfaces or the like.

Therefore, it is desired to find a way to provide a 360-degree image having a more three-dimensional effect without significant distortion of the image by using the plurality of projection surfaces.

SUMMARY

According to one or more example embodiments, an electronic device may include: a projection part; a memory storing at least one instruction; and a processor. The projection part may include a split prism for transmitting a part of light emitted from a light source in a front direction and reflecting a remaining part of light on at least one inclined surface in a lateral direction. The processor may be configured to convert an image corresponding to a received signal into a multi-sided image to be projected to a plurality of projection surfaces, and may control the projection part to project the converted multi-sided image to the plurality of projection surfaces through the split prism.

According to one or more example embodiments, provided is a controlling method of an electronic device which may include a projection part, the projection part including a split prism transmitting a part of light emitted from a light source in a front direction and reflecting a remaining part of light on at least one inclined surface in a lateral direction, wherein the method may include: converting an image corresponding to a received signal into a multi-sided image to be projected to a plurality of projection surfaces; and projecting the converted multi-sided image to the plurality of projection surfaces through the split prism.

According to one or more example embodiments, provided is a computer-readable recording medium which stores a program for executing a controlling method of an electronic device including a projection part, wherein the projection part may include a split prism transmitting a part of light emitted from a light source in a front direction and reflecting a remaining part of light on at least one inclined surface in a lateral direction, wherein the method may include: converting an image corresponding to a received signal into a multi-sided image to be projected to a plurality of projection surfaces; and projecting the converted multi-sided image to the plurality of projection surfaces through the split prism.

BRIEF DESCRIPTION OF THE DRAWINGS

Example embodiments herein are illustrated in the accompanying drawings, throughout which like reference letters indicate corresponding parts in the various figures. The embodiments herein will be better understood from the following description with reference to the drawings, in which:

FIG. 11B is a view for explaining a method of segmenting the image corresponding to the received signal by using the split prism including the two inclined surfaces according to other example embodiments.

DETAILED DESCRIPTION

Figure 1:
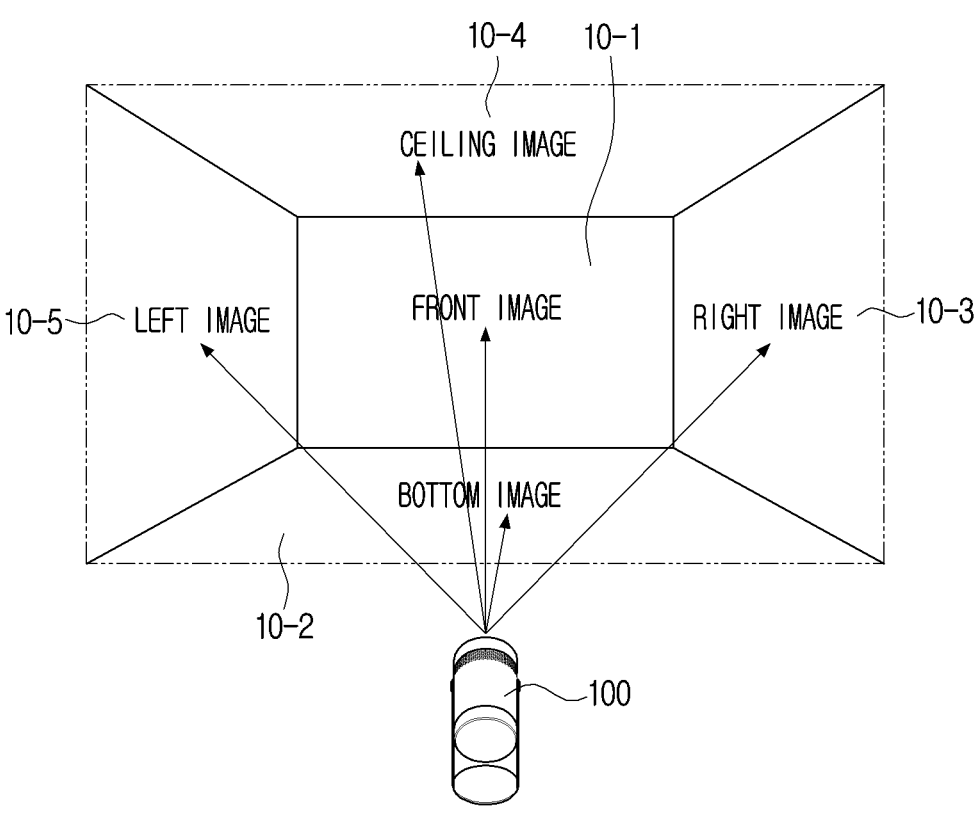
FIG. 1 is a view of projecting an image to a plurality of projection surfaces by using an electronic device according to one or more example embodiments.

The disclosure may be variously modified and have several embodiments, and specific example embodiments are thus shown in the drawings and described in detail in the detailed description. However, it is to be understood that the scope of the disclosure is not limited to the specific embodiments, and includes various modifications, equivalents and/or alternatives according to the example embodiments. Throughout the accompanying drawings, similar components are denoted by similar reference numerals.

In describing the disclosure, the description omits a detailed description of a case where the detailed description for the known functions or configurations related to the disclosure is determined to unnecessarily obscure the gist of the disclosure.

In addition, the following embodiments may be modified in various different forms, and the scope and spirit of the disclosure are not limited to the following embodiments. Rather, these embodiments are provided to make the disclosure thorough and complete, and to completely transfer the spirit of the disclosure to those skilled in the art. Terms used in the disclosure are used only to describe the specific embodiments rather than limiting the scope of the disclosure. A term of a singular number may include its plural number unless explicitly indicated otherwise in the context.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, expressions "A or B," "at least one of A and/or B," "one or more of A and/or B" and the like, may include all possible combinations of items enumerated together. For example, "A or B," "at least one of A and B" or "at least one of A or B" may indicate all of 1) a case where at least one A is included, 2) a case where at least one B is included, or 3) a case where both of at least one A and at least one B are included.

Expressions "first," "second" and the like, used in the disclosure may indicate various components regardless of a sequence or importance of the components. These expressions are used only to distinguish one component from the other components, and do not limit the corresponding components.

In case that any component (for example, a first component) is mentioned to be "(operatively or communicatively) coupled with/to" or "connected to" another component (for example, a second component), it is to be understood that any component is directly coupled to another component or coupled to another component through still another component(s) (for example, a third component).

On the other hand, in case that any component (for example, the first component) is mentioned to be "directly coupled" or "directly connected to" another component (for example, the second component), it is to be understood that still another component (for example, the third component) is not present between any component and another component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily indicate "specifically designed to" in hardware.

Instead, an expression a device "configured to" in any situation may indicate that the device may "perform~"

together with another device or component. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor except for a "module" or an "~er/or" that needs to be implemented by specific hardware. Thus, each "module" herein may comprise circuitry.

Meanwhile, various elements and regions in the drawings are schematically shown. Therefore, the spirit of the disclosure is not limited by relative sizes or intervals illustrated in the accompanying drawings.

Hereinafter, various example embodiments will be described in detail with reference to the accompanying drawings. FIG. 1 is a view of projecting an image to a plurality of projection surfaces by using an electronic device according to one or more example embodiments. As shown in FIG. 1, an electronic device 100 may be an image projection device such as a projector projecting an image to a wall or a screen.

In particular, the electronic device 100 according to one or more example embodiments may include a split prism transmitting a part of light emitted from a light source in a front direction, and reflecting the remaining part of light emitted from the light source on at least one inclined surface in a lateral direction.

In case of receiving a signal corresponding to the image, the electronic device 100 may segment the image corresponding to the received signal into a plurality of regions. In addition, the electronic device 100 may convert the image corresponding to the received signal into a multi-sided image to be projected to the plurality of projection surfaces based on the segmented plurality of regions. In addition, the electronic device 100 may project the converted multi-sided image to a plurality of projection surfaces 10-1 to 10-5 through the split prism. Here, the plurality of projection surfaces may be the front region 10-1, the bottom region 10-2, the right region 10-3, the ceiling region 10-4, and the left region 10-5, as shown in FIG. 1, which is only an example, and may be a plurality of regions other than the four regions.

That is, the electronic device 100 may project the image corresponding to the received signal through the split prism to the plurality of projection surfaces 10-1 to 10-5, as shown in FIG. 1. In detail, the electronic device 100 may segment the image corresponding to the received signal into a front image, a bottom image, a right image, a ceiling image, and a left image, respectively, and project the segmented front image, bottom image, right image, ceiling image, and left image respectively to the front region 10-1, the bottom region 10-2, the right region 10-3, the ceiling region 10-4, and the left region 10-5.

Accordingly, the electronic device may implement a 360-degree image by using the plurality of projection surfaces.

Each embodiment herein may be used in combination with any other embodiment(s) described herein.

Figure 2:
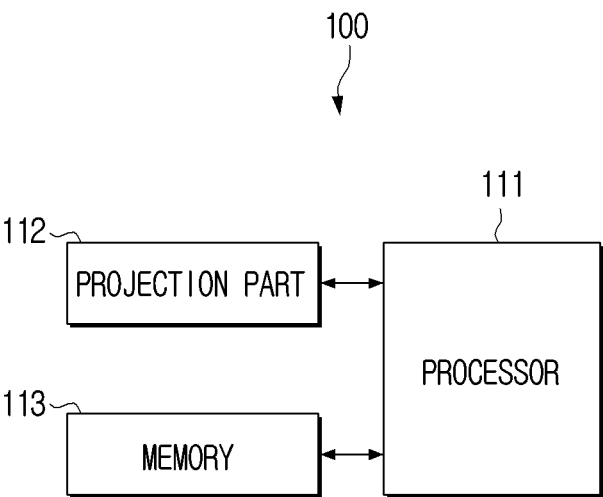
FIG. 2 is a view briefly showing a configuration of the electronic device according to one or more example embodiments.

FIG. 2 is a view briefly showing a configuration of the electronic device according to one or more example embodiments. As shown in FIG. 2, the electronic device 100 may include a projection part 112, a memory 113, and a processor 111 comprising processing circuitry. However, the configuration of the electronic device 100 shown in FIG. 2 is only an example, and other components may be added thereto or some components may be omitted therefrom.

The projection part 112 is a component projecting an image processed by the processor 111 to the outside. In particular, the projection part 112 according to one or more example embodiments may project the image to the projection surface by using a digital light processing (DLP) method, which is only an example, and may project the image to the projection surface by using a different method (for example, a cathode-ray tube (CRT) method, a liquid crystal display (LCD) method, or a laser method).

In addition, the projection part 112 may include the split prism transmitting a part of light emitted from the light source in the front direction, and reflecting the remaining part of light emitted from the light source on at least one inclined surface in the lateral direction. The description describes the projection part 112 including the split prism with reference to FIGS. 3A to 4B.

Figure 3A:
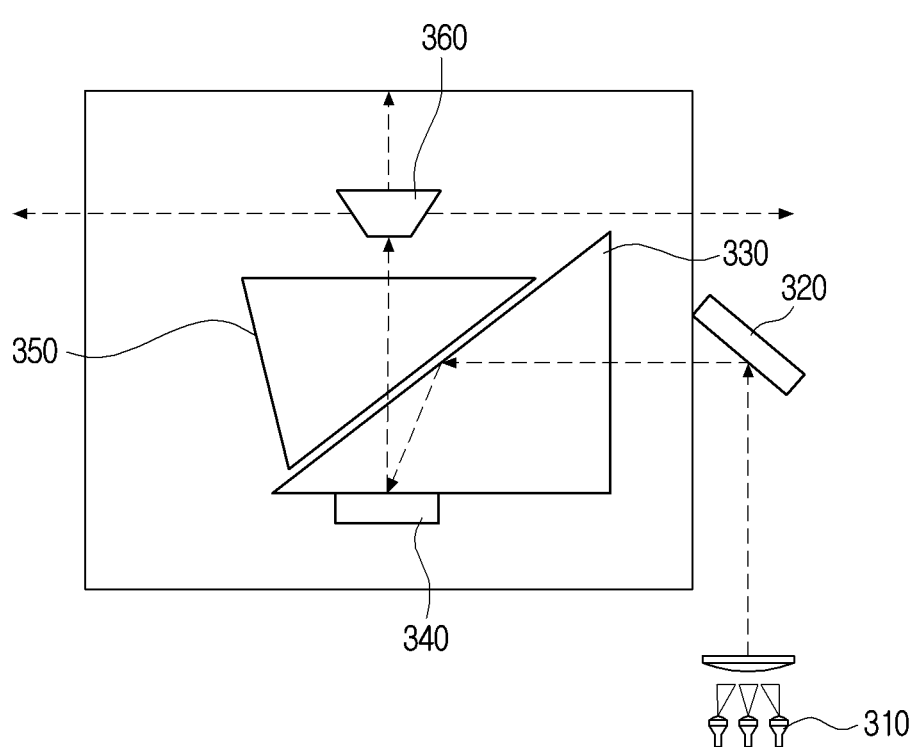
FIG. 3A is a view showing a configuration of a projection part according to one or more example embodiments.

As shown in FIG. 3A, the projection part 112 may include a light source 310, a reflection mirror 320, a first prism 330, a digital micromirror device (DMD) 340, a second prism 350, and a split prism 360.

The projection part 112 may emit (or output) light toward the reflection mirror 320 through the light source 310. The reflection mirror 320 may reflect light emitted from the light source 310 to the first prism. Light reflected through the reflection mirror 320 may pass through the first prism 330 and then be reflected from a reflecting surface of the first prism 330 to the DMD 340. Here, first prism 330 may be implemented as a total internal reflection (TIR) prism used for changing a direction of light, and may include the reflecting surface to reflect light reflected from the reflection mirror 320 to the DMD 340.

The DMD 340 may reflect light reflected from the reflecting surface of the first prism 330 to the second prism 350 and the split prism 360. Here, the DMD 340 may adjust a reflection angle of light incident from the first prism 330. In particular, the DMD 340 may have a plurality (e.g., about 1.3 million) of micromirrors integrated with each other, and each micromirror may adjust the reflection angle of light incident from the outside in response to an individual digital control signal.

Light reflected from the DMD 340 may be incident to the split prism 360 through the first and second prisms 330 and 350. Here, the second prism 350 may transmit light reflected from the DMD 340 to the split prism 360.

The split prism 360 may transmit a part of light reflected from the DMD 340 in the front direction, and reflect the remaining part of light reflected from the DMD 340 on at least one inclined surface in the lateral direction.

Figure 3B:
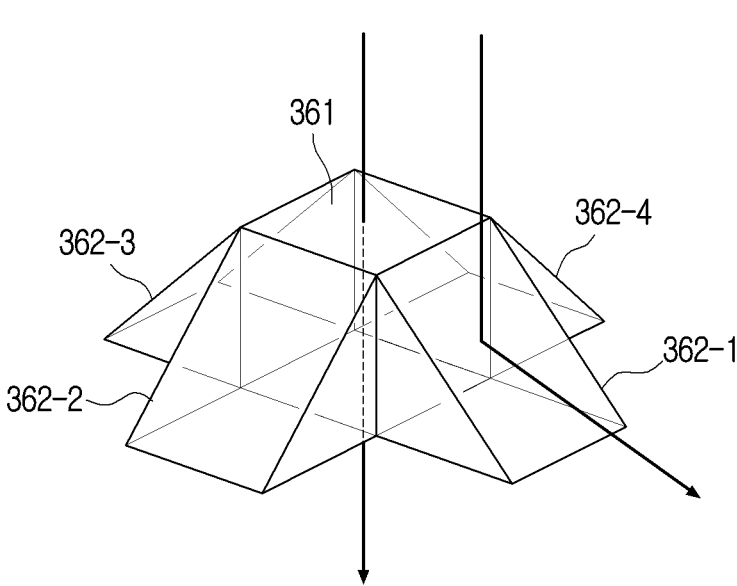
FIG. 3B is a view showing a split prism including a plurality of inclined surfaces, according to one or more example embodiments.

In an example, as shown in FIG. 3B, the split prism 360 may include a hole 361 positioned in its central region to transmit a part of the light in the front direction, a first inclined surface 362-1 positioned in a first lateral direction (e.g., downward direction) of the hole 361 and reflecting a part of light in the first lateral direction (e.g., downward direction), a second inclined surface 362-2 positioned in a second lateral direction (e.g., right direction) of the hole 361 and reflecting a part of light in the second lateral direction (e.g., right direction), a third inclined surface 362-3 positioned in a third lateral direction (e.g., upward direction) of the hole 361 and reflecting a part of light in the third lateral direction (e.g., upward direction), and a fourth inclined surface 362-4 positioned in a fourth lateral direction (e.g., left direction) of the hole 361 and reflecting a part of light in the fourth lateral direction (e.g., left direction).

That is, the split prism 360 may transmit light in its central region among light reflected from the DMD 340 through the hole 361 in the front direction, and reflect light of its lateral regions among light reflected from the DMD 340 through the plurality of inclined surfaces 362-1 to 362-4 in the plurality of lateral directions.

Figure 4A:
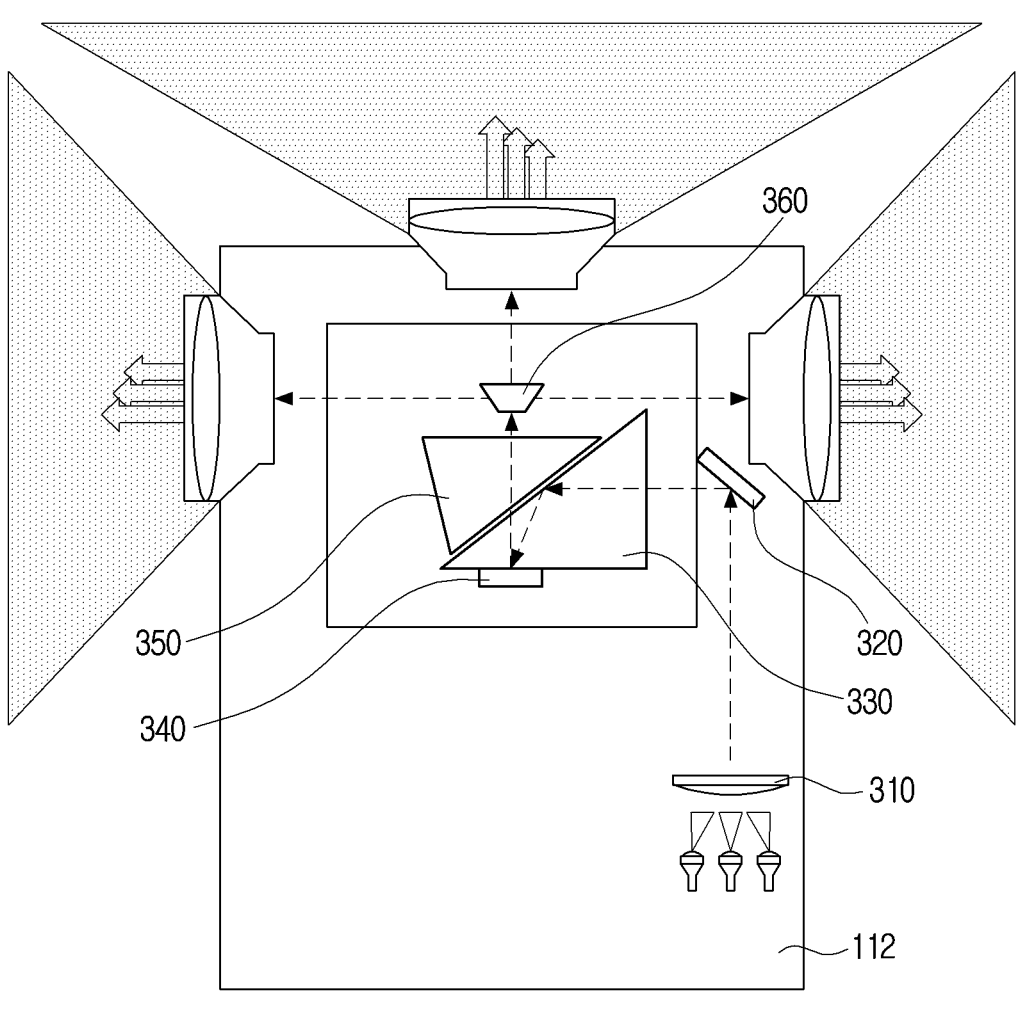
FIG. 4A is a top view of the projection part including the split prism according to one or more example embodiments.

FIG. 4A is a top view of the projection part including the split prism according to one or more example embodiments. That is, in case that light is output from the light source 310, the projection part 112 of the electronic device 100 may project not only the front image through light transmitted through the hole 361, but also the right image and the left image through light reflected on the second inclined surface 362-2 and fourth inclined surface 362-4 of the split prism 360.

Figure 4B:
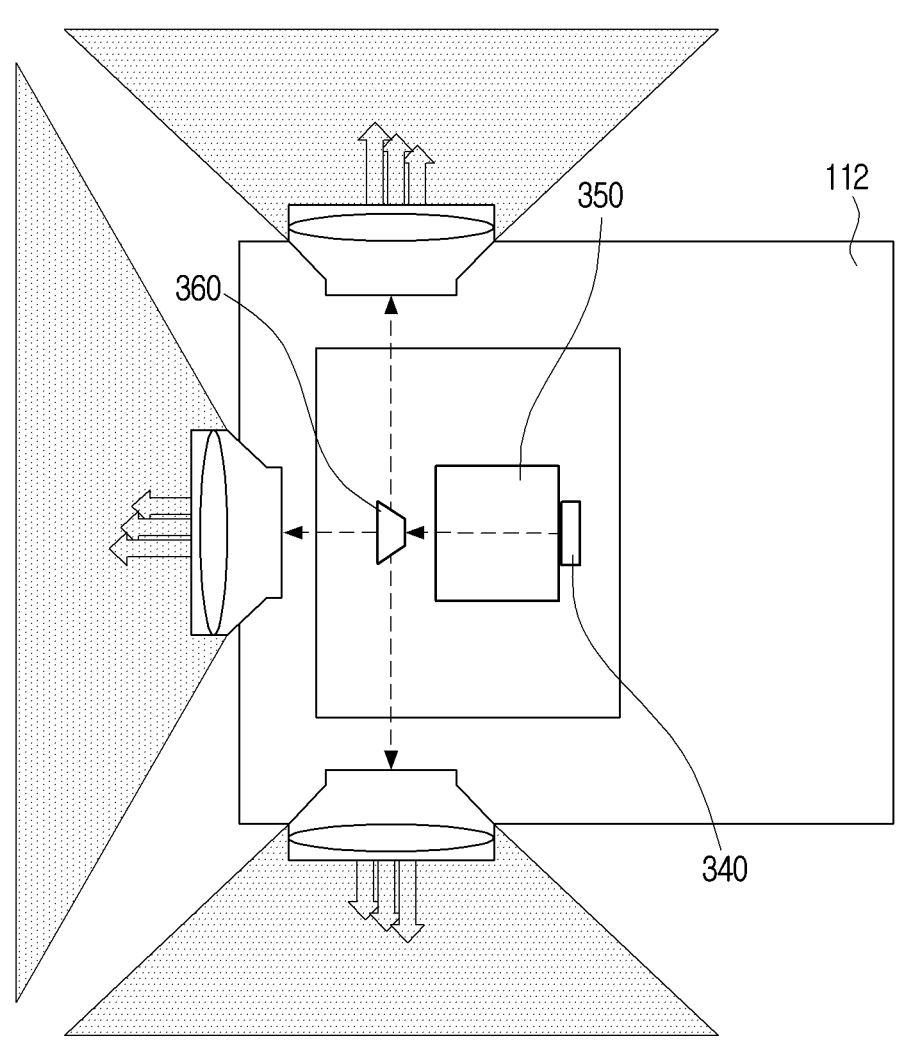
FIG. 4B is a side view of the projection part including the split prism according to one or more example embodiments.

FIG. 4B is a side view of the projection part including the split prism according to one or more example embodiments. In addition, in case that light is output from the light source 310, the projection part 112 of the electronic device 100 may project not only the front image through light transmitted through the hole 361, but also the bottom image and the ceiling image through light reflected on the first inclined surface 362-1 and third inclined surface 362-3 of the split prism 360.

Accordingly, as shown in FIG. 1, the electronic device 100 may output the image through not only the projection surface 10-1 in the front direction but also the plurality of projection surfaces 10-2 to 10-5 in the lateral directions.

Meanwhile, the split prism 360 is described as including the hole 361 and the four inclined surfaces 362-1 to 362-4 with reference to FIGS. 3A to 4B, which is only an example, and may include various types of inclined surfaces. The various types of inclined surfaces are described in detail below with reference to FIGS. 10A to 12B.

In addition, the projection part 112 according to one or more example embodiments may further include a liquid crystal lens disposed between the second prism 350 through which light reflected by the DMD 340 passes and the split prism 360. This configuration is described below with reference to FIGS. 9A and 9B.

Figure 5:
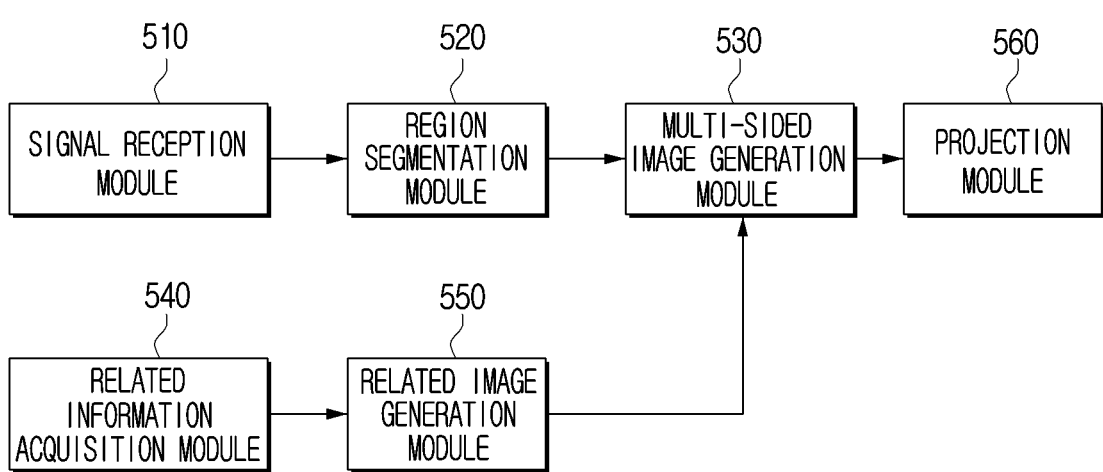
FIG. 5 is a block diagram including a configuration for generating a multi-sided image projected to the plurality of projection surfaces according to one or more example embodiments.

Referring again to FIG. 2, the memory 113 may store an operating system (OS) for controlling overall operations of components of the electronic device 100, and instructions or data on the components of the electronic device 100. In particular, as shown in FIG. 5, the memory 113 may include a signal reception module 510, a region segmentation module 520, a multi-sided image generation module 530, a related information acquisition module 540, a related image generation module 550, and a projection module 560 to generate the multi-sided image which is the image projected to the plurality of projection surfaces. In particular, in case of executing a function of projecting the multi-sided image to the plurality of projection surfaces (e.g., second projection mode), the electronic device 100 may load, into a volatile memory, data stored in a non-volatile memory that is necessary for various modules to perform various operations to generate the multi-sided image which is the image projected to the plurality of projection surfaces. Here, "loading" refers to an operation of loading and storing data stored in the non-volatile memory into the volatile memory for the processor 111 to access the data.

Meanwhile, the memory 113 may be implemented as the non-volatile memory (e.g., hard disk, solid state drive (SSD), or flash memory), the volatile memory (which may also include a memory in the processor 111), or the like.

The processor 111 may control the electronic device 100 based on at least one instruction stored in the memory 113.

In particular, the processor 111 may include at least one processor. In detail, at least one processor may include at least one of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. At least one processor may control one of other components of the electronic device or any combination thereof, and perform operations related to the communication or the data processing. At least one processor may execute at least one program or instruction stored in the memory. For example, at least one processor may perform a method according to one or more example embodiments by executing at least one instruction stored in the memory.

A plurality of operations may be performed by one processor or may be performed by a plurality of processors in case that the method according to one or more example embodiments includes the plurality of operations. That is, a first operation, a second operation, and a third operation may be performed by the method according to one or more embodiments. In this case, the first operation, the second operation, and the third operation may all be performed by a first processor. Alternatively, the first operation and the second operation may be performed by the first processor (for example, a general-purpose processor), and the third operation may be performed by a second processor (for example, an artificial intelligence-only processor).

At least one processor may be implemented as a single core processor including one core, or may be implemented as at least one multicore processor including multicores (e.g., homogeneous multicores or heterogeneous multicores). In case that at least one processor is implemented as the multicore processor, each of the multicores included in the multicore processor may include a processor internal memory such as a cache memory or an on-chip memory, and a common cache shared by the multicores may be included in the multicore processor. In addition, each of the plurality of cores included in the multicore processor (or some of the multicores) may independently read and perform a program instruction for implementing the method according to one or more example embodiments, or all (or some) of the multicores may be linked with each other to read and perform the program instruction for implementing the method according to one or more example embodiments.

In case that the method according to one or more example embodiments includes a plurality of operations, the plurality of operations may be performed by one core among the multicores included in the multicore processor, or may be performed by the multicores. For example, in case that the first operation, the second operation, and the third operation are performed by the method according to other embodiments, the first operation, the second operation, and the third operation may all be performed by a first core included in the multicore processor. Alternately, the first operation and the second operation may be performed by the first core included in the multicore processor, and the third operation may be performed by a second core included in the multicore processor.

In the example embodiments, the processor may refer to a system-on-chip (SoC) in which at least one processor and other electronic components are integrated, the single core processor, the multicore processor, or the core included in the single core processor or the multicore processor. Here, the core may be implemented as the CPU, the GPU, the APU, the MIC, the DSP, the NPU, the hardware accelerator, or the machine learning accelerator. However, the example embodiments are not limited thereto.

In particular, in case of receiving the signal corresponding to the image, the processor 111 may segment the image corresponding to the received signal into the plurality of regions. The processor 111 may convert the image corresponding to the received signal into the multi-sided image to be projected to the plurality of projection surfaces based on the segmented plurality of regions. The processor 111 may control the projection part 112 to project the converted multi-sided image to the plurality of projection surfaces through the split prism 360.

In particular, the processor 111 may segment the image corresponding to the received signal into the front region and the first to fourth lateral regions respectively corresponding to the first to fourth lateral directions. In addition, the processor 111 may convert the front region and the first to fourth lateral regions respectively into the front image and first to fourth lateral images by using at least one conversion matrix. In addition, the processor 111 may acquire (or generate) the multi-sided image including the front image and the first to fourth lateral images.

In addition, the processor 111 may acquire at least one of information on the image corresponding to the received signal, information on another image, or real-time environment information. In addition, the processor 111 may segment the image corresponding to the received signal into the front region and at least one lateral region corresponding to at least one of the first to fourth lateral directions. The processor 111 may convert the front region and at least one lateral region respectively into the front image and at least one lateral image by using at least one conversion matrix. The processor 111 may generate one or more lateral image corresponding to at least one remaining direction among the first to fourth lateral directions based on at least one of the information on the image corresponding to the received signal, the information on another image, or the real-time environment information. The processor 111 may acquire the multi-sided image including the front image, the at least one lateral image and one or more lateral images. Here, the type or display position of an image displayed on the one or more lateral image may be changed by a user input.

In addition, the processor 111 may operate in one of a first projection mode of projecting the image corresponding to the received signal to the projection surface in the front direction, and a second projection mode of converting the image corresponding to the received signal into the multi-sided image and projecting the multi-sided image to the plurality of projection surfaces. Here, the processor 111 may operate in one of the first projection mode and the second projection mode by applying a voltage to the liquid crystal lens to adjust a focal length of the liquid crystal lens.

In addition, the processor 111 may acquire information on a user position, a position of the electronic device 100, and a type of projection surface based on a sensing value acquired by a sensor (not shown). In addition, the processor 111 may determine an image segmentation type based on the information on the user position, the position of the electronic device 100, and the type of projection surface.

In addition, the processor 111 may acquire information on a distance between the projection surface and the electronic device 100 based on the sensing value acquired by the sensor. In addition, the processor 111 may adjust sizes of the plurality of images included in the multi-sided image or perform keystone correction based on the information on the distance between the projection surface and the electronic device 100.

Hereinafter, the description describes a method of projecting the multi-sided image to the plurality of projection surfaces with reference to FIGS. 5 to 8B. FIG. 5 is a block diagram including a configuration for generating the multi-sided image projected to the plurality of projection surfaces according to one or more example embodiments. As shown in FIG. 5, the electronic device 100 may include the signal reception module 510, the region segmentation module 520, the multi-sided image generation module 530, the related information acquisition module 540, the related image generation module 550, and the projection module 560 to generate the multi-sided image projected on the plurality of projection surfaces.

The signal reception module 510 may receive signals corresponding to images from various sources. For example, the signal reception module 510 may receive a signal corresponding to an image content from the outside through a communication interface 114 comprising circuitry, receive a signal corresponding to an image content from an external device through an input/output interface 116 (e.g., see FIG. 19), and receive a signal corresponding to an image content stored in the memory 113. Here, the images corresponding to the signals may be a general image, which is only an example, and may be various images such as virtual reality (VR) images or panoramic images.

The region segmentation module 520 may segment the image corresponding to the received signal into the plurality of regions. In detail, the region segmentation module 520 may segment the image corresponding to the received signal based on the number of inclined surfaces included in the split prism 360. For example, the number of inclined surfaces included in the split prism 360 may be four, as shown in FIG. 3B. In this case, the region segmentation module 520 may segment the image corresponding to the received signal into one front region and the four lateral regions. That is, in case of receiving a signal corresponding to an image 610 as shown in the first drawing of FIG. 6, the region segmentation module 520 may segment the image 610 corresponding to the received signal into a front region 620-1, a lower region 620-2, a right region 620-3, an upper region 620-4, and a left region 620-5, as shown in the second drawing of FIG. 6. Here, as shown in the second drawing of FIG. 6, the front region 620-1 may have a rectangular shape, and each of the lower region 620-2, the right region 620-3, the upper region 620-4, and the left region 620-5 may have a trapezoidal shape.

Figure 6:
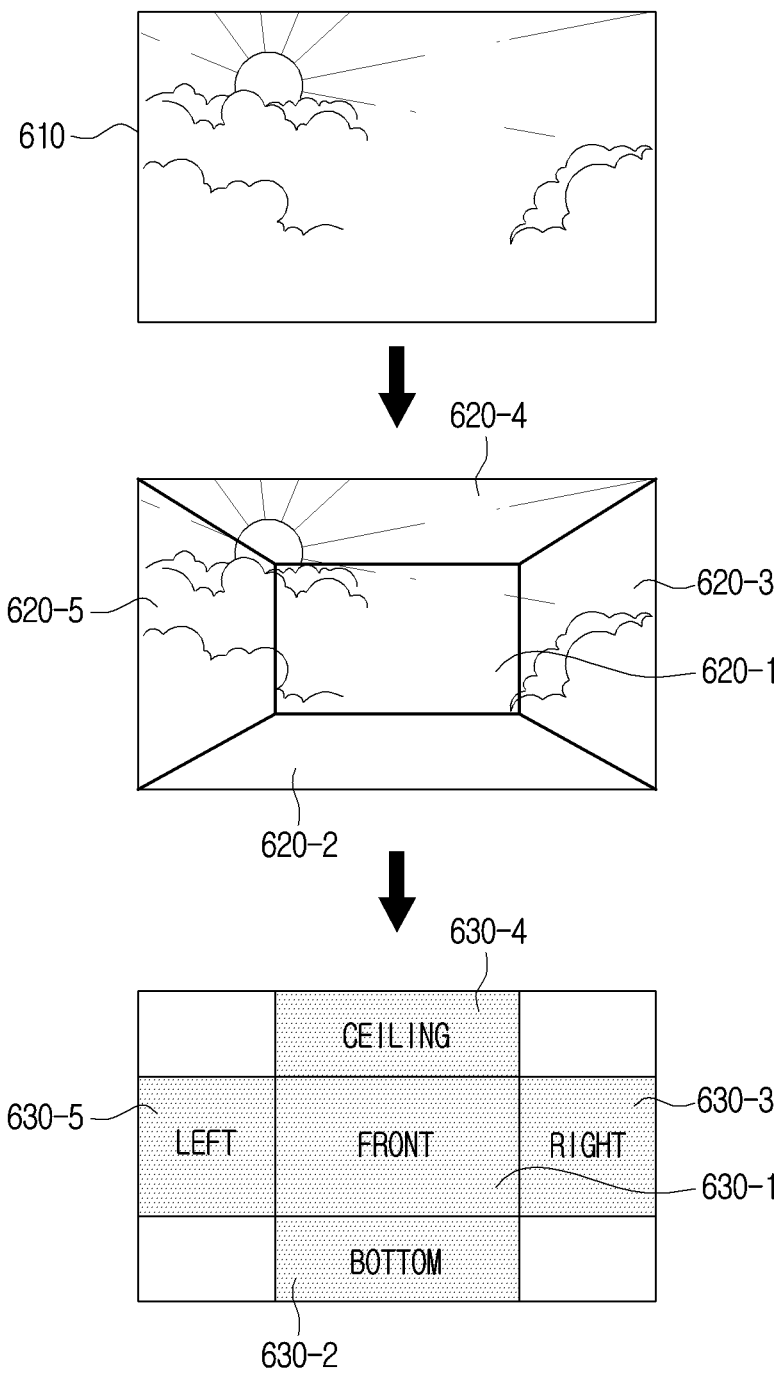
FIG. 6 is a view for explaining a method of generating a multi-sided image by segmenting an image corresponding to a received signal into a plurality of regions according to one or more example embodiments.

The multi-sided image generation module 530 may convert the image corresponding to the received signal into the multi-sided image to be projected to the plurality of projection surfaces based on the segmented regions. In detail, the multi-sided image generation module 530 may convert the segmented plurality of regions into the plurality of images by using at least one conversion matrix. For example, the multi-sided image generation module 530 may convert the front region to the front image by using a first conversion matrix, convert the first lateral region to the first lateral image by using a second conversion matrix, convert the second lateral region to the second lateral image by using a third conversion matrix, convert the third lateral region to the third lateral image by using a fourth conversion matrix, and convert the fourth lateral region to the fourth lateral image by using a fifth conversion matrix. That is, as shown in FIG. 6, the multi-sided image generation module 530 may convert the front region 620-1 to a front image 630-1, convert the lower region 620-2 to a bottom image 630-2, convert the right region 620-3 to a right image 630-3, convert the upper region 620-4 to a ceiling image 630-4, and convert the left region 620-5 to a left image 620-5. Here, the first conversion matrix may be a matrix for adjusting a size of the front region 620-1, and the second to fifth conversion matrices may be matrices for adjusting at least one of the sizes and shapes of the lower region 620-2, the right region 620-3, the upper region 620-4, and the left region 620-5. In addition, as shown in the third drawing of FIG. 6, the multi-sided image generation module 530 may generate (or acquire) a cross-shaped multi-sided image including the front image 630-1, the bottom image 630-2, the right image 630-3, the ceiling image 630-4, and the left image 630-5.

The related information acquisition module 540 may acquire at least one of the information on the image corresponding to the received signal, the information on another image, or the real-time environment information. In detail, the related information acquisition module 540 may acquire the information on the image corresponding to the received signal, such as title information, plot information, and actor and crew information, subtitle information of the image corresponding to the received signal, information on an object included in the image corresponding to the received signal, or the like. In addition, the related information acquisition module 540 may acquire the information on another image such as information on another channel currently broadcasting or information on an image related to the image corresponding to the received signal. In addition, the related information acquisition module 540 may acquire the real-time environment information, such as the real-time environment information (e.g., weather information) and information on an internet of things (IOT) device currently connected to the electronic device 100.

The related image generation module 550 may acquire one or more related images based on at least one of the information on the image corresponding to the received signal, the information on another image, or the real-time environment information, acquired by the related information acquisition module 540. That is, the related image generation module 550 may acquire one or more related images among a first related image including the information on the image corresponding to the received signal, such as the acquired title information, plot information, and actor and crew information, a second related image including the subtitle information of the image corresponding to the received signal, a third related image including the information on the object included in the image corresponding to the received signal, a fourth related image including the information on another channel currently being broadcast, a fifth related image including the information on the image related to the image corresponding to the received signal, a sixth related image including the real-time environment information, and a seventh related image including the information on the IOT device currently connected to the electronic device 100. one or more related images acquired here may be converted to one or more lateral images.

Here, the multi-sided image generation module 530 may generate the multi-sided image by using the front image and at least one lateral image acquired by the region segmentation module 520 and one or more lateral image acquired by the related image generation module 550.

Figure 7:
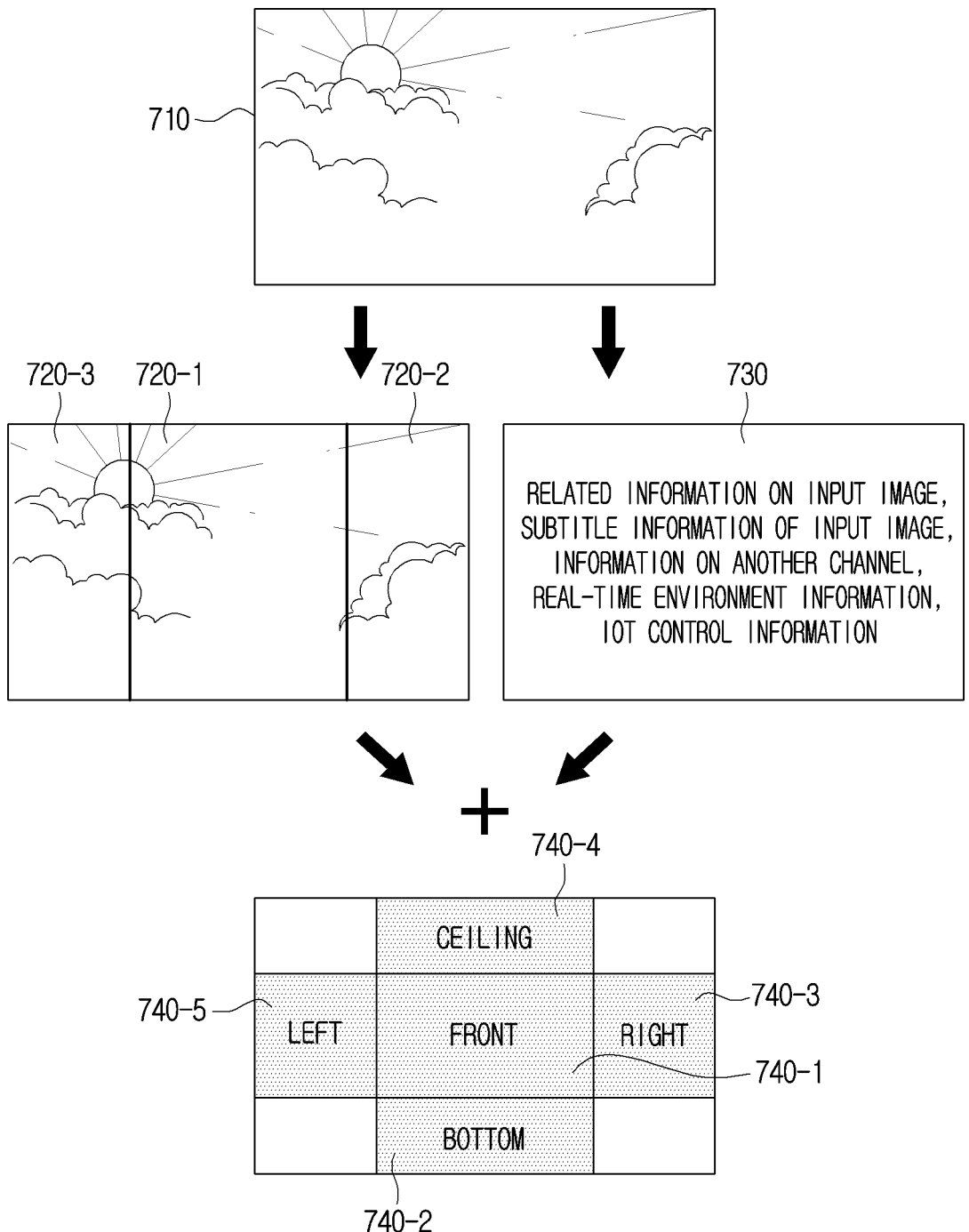
FIG. 7 is a view for explaining a method of generating a multi-sided image by using the image corresponding to the received signal and information on the image corresponding to the received signal, according to one or more example embodiments.

In detail, as shown in FIG. 7, in case of receiving a signal corresponding to an image 710 through the signal reception module 510, the region segmentation module 520 may segment the image 710 corresponding to the received signal into a front region 720-1, a right region 720-2, and a left region 720-3. In addition, the related information acquisition module 540 may acquire related information 730 including the related information on the image corresponding to the received signal, the subtitle information of the image corresponding to the received signal, the information on another channel, the real-time environment information, and IOT control information. In addition, the related image generation module 550 may acquire one or more related images based on the related information 730.

In addition, the multi-sided image generation module 530 may respectively convert the segmented front region 720-1, right region 720-2, and left region 720-3 through at least one conversion matrix to a front image 740-1, a right image 740-3, and a left image 740-5. In addition, the multi-sided image generation module 530 may convert the first related image to a bottom image 740-2, and convert the second related image to a ceiling image 740-4. In addition, as shown in the last drawing of FIG. 7, the multi-sided image generation module 530 may generate (or acquire) a cross-shaped multi-sided image including the front image 740-1, the bottom image 740-2, the right image 740-3, the ceiling image 740-4, and the left image 740-5.

Here, the multi-sided image generation module 530 may determine a method of displaying a text or an image, included in the related image, based on a display position of the related image. For example, in case that the related image is displayed on a left or right side, the related image generation module 550 may display the text in a vertical direction. In addition, in case that the related image is displayed on the bottom or the ceiling, the related image generation module 550 may display the text in a horizontal direction.

In addition, the type or display position of the image displayed on one or more lateral images may be changed by the user input. For example, a user may set the real-time environment information to be displayed as the left image and the information on the image corresponding to the received signal to be displayed as the right image. In this case, the related image generation module 550 may convert the sixth related image to the left image, and convert the first related image to the right image.

The projection module 560 may control the projection part 112 to project the multi-sided image generated by the multi-sided image generation module 530 to the plurality of projection surfaces. In particular, the projection module 560 may perform various functions for adjusting the multi-sided image. For example, the projection module 560 may perform functions such as a zoom function, a keystone function, a quick corner (or four corner) keystone function, and a lens shift function.

Meanwhile, the electronic device 100 according to one or more example embodiments may acquire the multi-sided image by using not only the general image but also the VR image. In particular, the electronic device 100 may acquire the image corresponding to the received signal as the multi-sided image by using the cube map image processing technique.

Figure 8A:
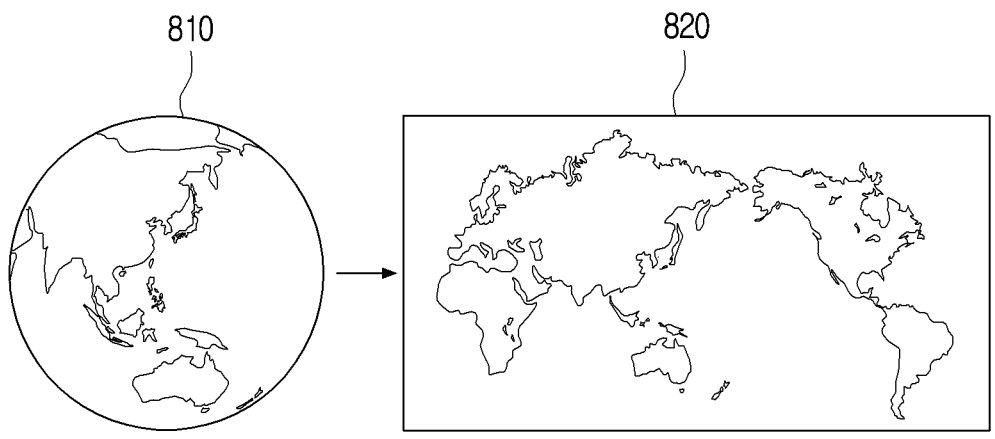
FIGS. 8A,8B, and 8C are views for explaining a method of generating a multi-sided image by using a cube map image processing technique according to one or more example embodiments.

FIG. 8A is a view for explaining an equirectangular projection. That is, in case of using equirectangular projection, a circular image 810 may be converted to a flat image 820 as shown in FIG. 8A.

Figure 8B:
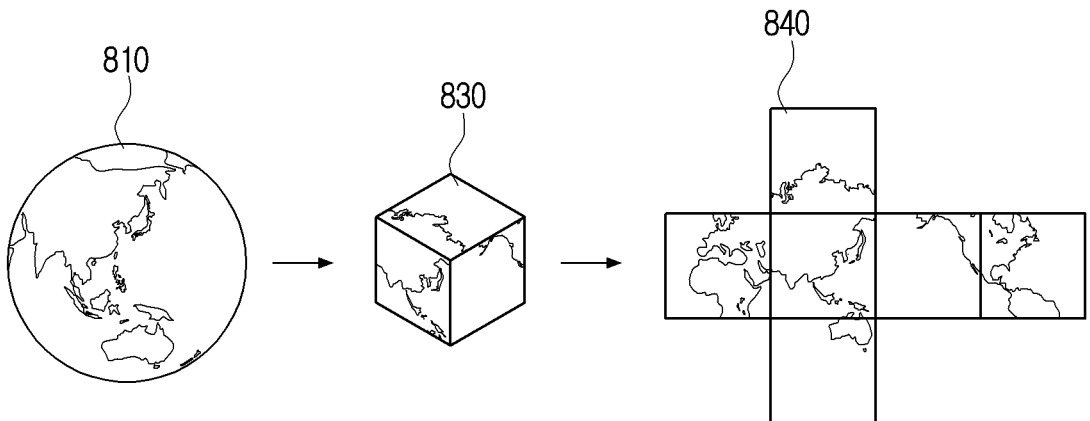

FIG. 8B is a view for explaining cube map projection. That is, in case of using the cube map projection, the circular image 810 may be converted to a cube image 830 as shown in FIG. 8B, and the cube image 830 may be converted to a cross-shaped plan view image 840.

Figure 8C:
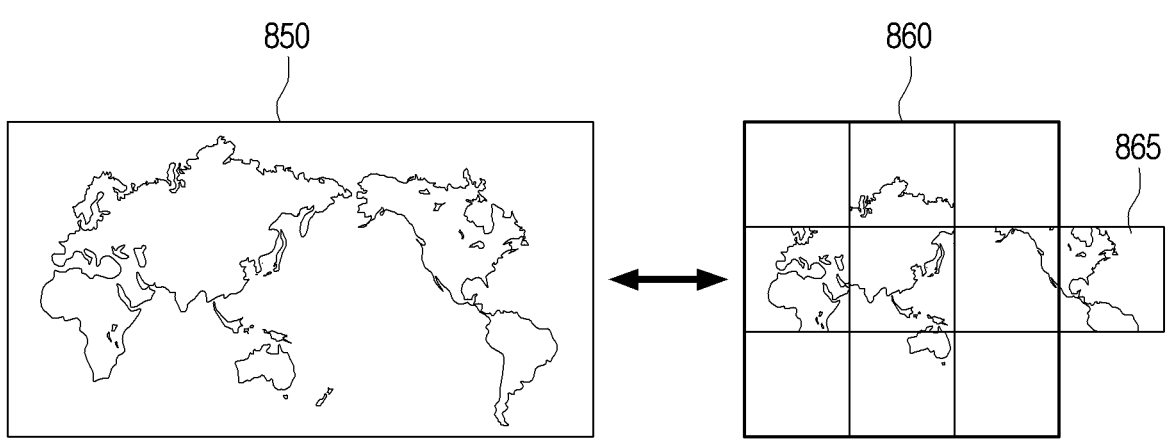

Therefore, as shown in FIG. 8C, in case of receiving a signal corresponding to a flat VR image 850, the electronic device 100 may convert the VR image 850 corresponding to a flat signal into a cross-shaped plan view image 860 without a separate image segmentation. That is, the electronic device 100 may acquire the multi-sided image by converting the flat VR image 850 input based on a predetermined conversion matrix acquired using the equirectangular projection and the cube map projection into the cross-shaped plan view image 860. In particular, in case that the flat VR image 850 is converted to the cross-shaped plan view image 860, one image (e.g., an image 865) of the cross-shaped plan view image 860 may be an image corresponding to a back side of the VR image. Therefore, the electronic device 100 may acquire the multi-sided image by removing one image 865 from the plan view image 860.

In addition, the electronic device 100 according to one or more example embodiments may further include the sensor, and perform various operations based on the sensing value sensed by the sensor.

In detail, the processor 111 may acquire the information on the user position, the position of the electronic device 100, and the type of projection surface based on the sensing value acquired by the sensor. In addition, the processor 111 may determine the image segmentation type based on at least one of the information on the user position, the position of the electronic device 100, or the type of projection surface.

Figure 9A:
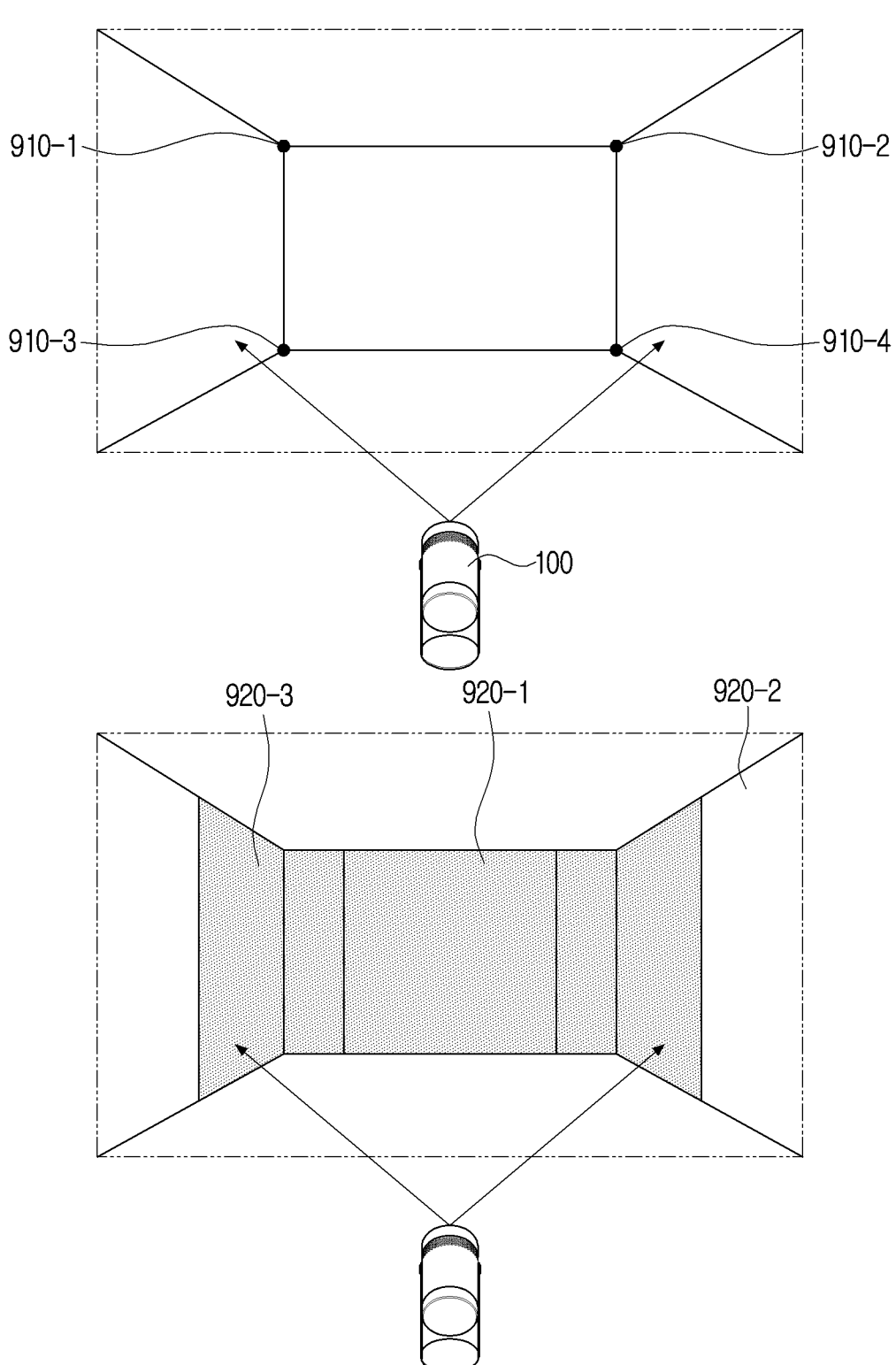
FIGS. 9A and 9B are views for explaining a method of determining an image segmentation type based on information on a position of the electronic device and a type of the projection surface, according to one or more example embodiments.

For example, as shown in the upper drawing of FIG. 9A, in case of detecting four vertices 910-1, 910-2, 910-3, and 910-4 on a front projection surface based on the sensing value sensed by the sensor, the processor 111 may generate the multi-sided image including a front image 920-1, a right image 920-2, and a left image 920-3, and project the multi-sided image on three projection surfaces, as shown in the lower drawing of FIG. 9A. In addition, as shown the upper drawing of FIG. 9B, in case of detecting two vertices 930-1 and 930-2 on the front projection surface based on the sensing value sensed by the sensor, the processor 111 may generate the multi-sided image including a front image 940-1, a right image 940-2, and a left image 940-3, including an edge connecting the two vertices 930-1 and 930-2 with each other, and project the multi-sided image to two projection surfaces, as shown in the lower drawing of FIG. 9B.

Figure 9B:
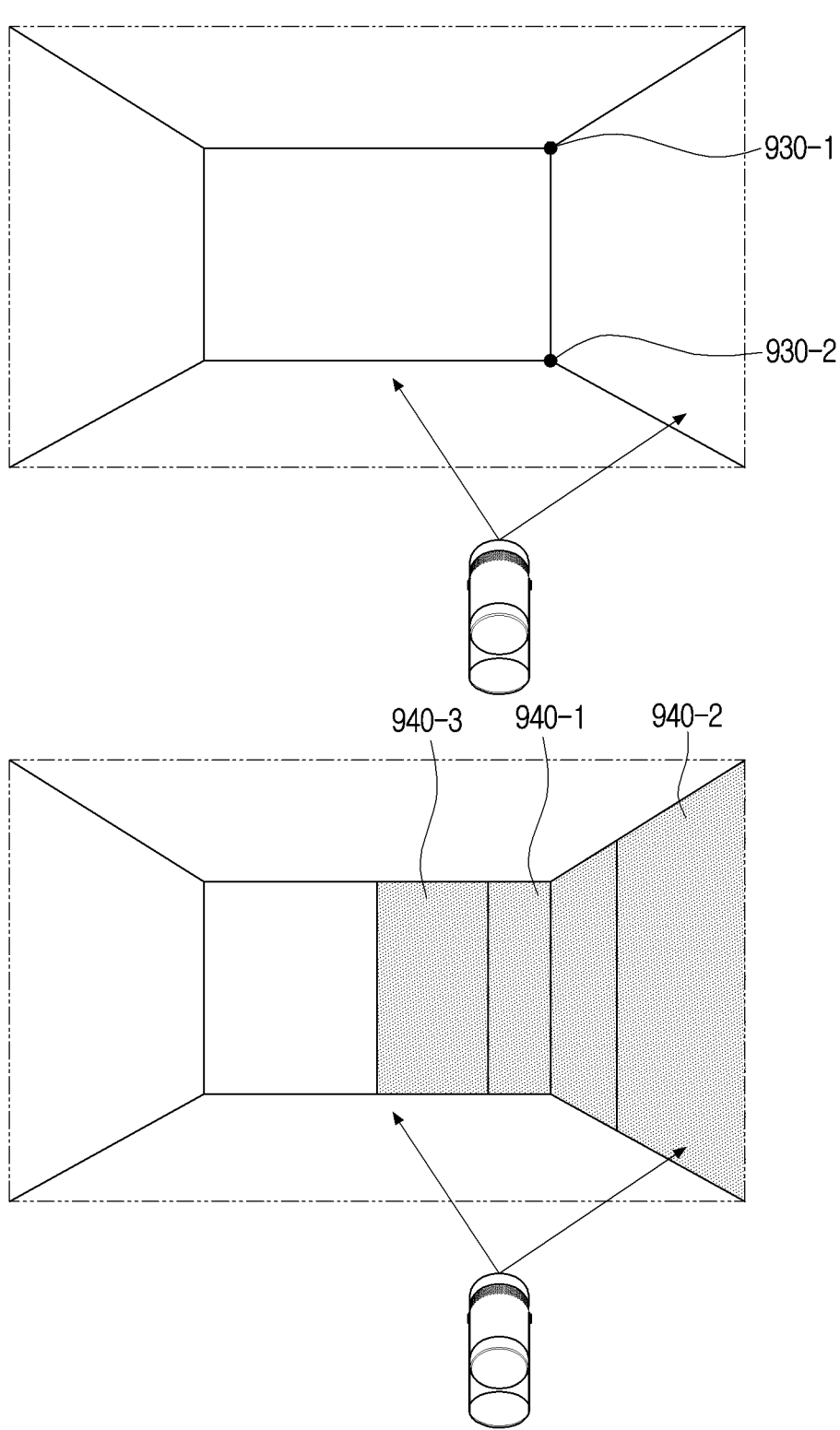

Here, the processor 111 may control the projection part 112 to have different focal points in situations of FIGS. 9A and 9B. That is, in the situation of FIG. 9A, the processor 111 may control the projection part 112 to have a first focal length, and in the situation of FIG. 9B, the processor 111 may control the projection part 112 to have a second focal length different from the first focal length.

In addition, the processor 111 may acquire the information on the distance between the projection surface and the electronic device 100 based on the sensing value acquired by the sensor, and may adjust the sizes of the plurality of images included in the multi-sided image based on the information on the distance between the projection surface and the electronic device 100.

For example, in case that the distance between the front projection surface and the electronic device 100 is a first distance, the processor 111 may adjust a size of the front region included in the multi-sided image to a first size. In case that the distance between the front projection surface and the electronic device 100 is a second distance greater than the first distance, the processor 111 may adjust the size of the front region included in the multi-sided image to a second size smaller than the first size. In case that the distance between the front projection surface and the electronic device 100 is a third distance smaller than the first distance, the processor 111 may adjust the size of the front region included in the multi-sided image to a third size greater than the first size.

In addition, the processor 111 may acquire the information on the distance between the projection surface and the electronic device 100 based on the sensing value acquired by the sensor, and may perform the keystone correction based on the information on the distance between the projection surface and the electronic device 100.

Meanwhile, the electronic device 100 according to one or more example embodiments may operate in one of the first projection mode of projecting the image corresponding to the received signal to the projection surface in the front direction, and the second projection mode of converting the image corresponding to the received signal into the multi-sided image and projecting the same to the plurality of projection surfaces.

Figure 10A:
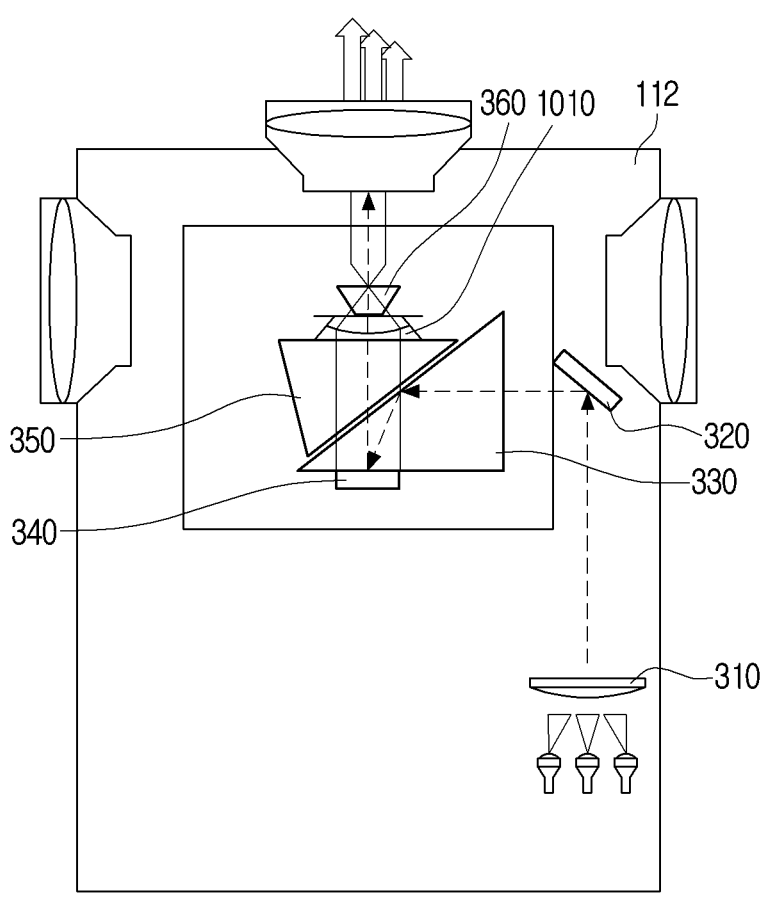
FIGS. 10A and 10B are views for explaining a method of operating the electronic device in a first projection mode and a second projection mode by using a liquid crystal lens according to one or more example embodiments.
Figure 10B:
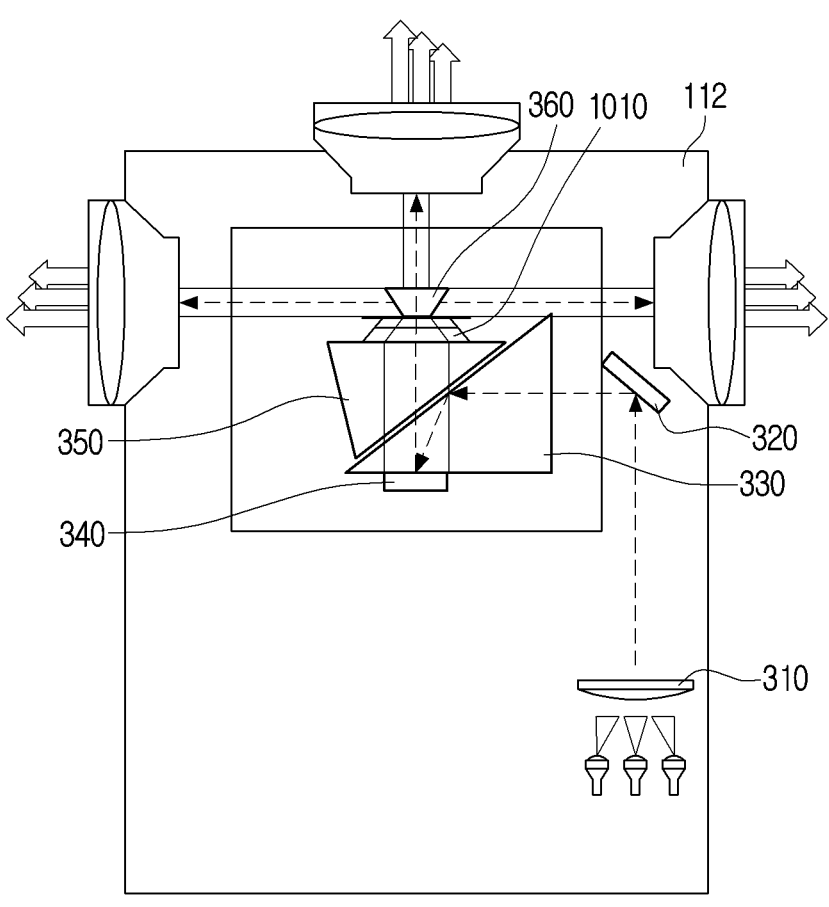

For example, as shown in FIGS. 10A and 10B, the projection part 112 may further include a liquid crystal lens 1010 disposed between the second prism 350 through which light reflected by the DMD 340 passes and the split prism 360. In addition, the processor 111 may operate in one of the first projection mode and the second projection mode by applying the voltage to the liquid crystal lens 1010 to adjust a focal length of the liquid crystal lens 1010.

For example, in case that the electronic device 100 operates in the first projection mode, the projection part 112 may apply a first voltage to the liquid crystal lens 1010 to adjust its focal length to the first distance, as shown in FIG. 10A. That is, the first voltage may be applied to the liquid crystal lens 1010, and the liquid crystal lens 1010 may thus serve as a convex lens. Accordingly, light reflected by the DMD 340 may be refracted by the liquid crystal lens 1010 and pass only through the hole 361 of the split prism 360 to be transmitted only in the front direction. Therefore, the electronic device 100 may operate in the first projection mode of projecting the image only to the projection surface in the front direction. In case that the electronic device 100 operates in the second projection mode, the projection part 112 may apply a second voltage to the liquid crystal lens 1010 to adjust its focal length to the second distance greater than the first distance, as shown in FIG. 10B. That is, light reflected by the DMD 340 may not only pass through the hole 361 of the split prism 360, but also reach the plurality of inclined surfaces 362-1 to 362-4 to be reflected. Accordingly, the electronic device 100 may operate in the second projection mode of projecting the multi-sided image to the projection surface in the front direction as well as the plurality of projection surfaces in the lateral direction.

For another example, in case that the electronic device 100 operates in the first projection mode, the processor 111 may change the image corresponding to the received signal to the front image, and generate the plurality of lateral images by using a monochromatic screen of a specific color and specific brightness. In addition, the processor 111 may generate the multi-sided image by using the front image and the plurality of lateral images and project the generated multi-sided image to thus project the image corresponding to the received signal only to the projection surface in the front direction. In case that the electronic device 100 operates in the second projection mode, as shown in FIGS. 2 to 7, the processor 111 may generate the multi-sided image and project the generated multi-sided image to thus project the image corresponding to the received signal to the plurality of projection surfaces.

For another example, in case that the electronic device 100 operates in the first projection mode, the processor 111 may control the position of the split prism 360 for light reflected by the DMD 340 not to pass through the split prism 360. In case that the electronic device 100 operates in the second projection mode, the processor 111 may control the position of the split prism 360 for light reflected by the DMD 340 to pass through the split prism 360.

Meanwhile, the split prism 360 is described as including the hole 361 and the four inclined surfaces 362-1 to 362-4 with reference to FIGS. 3A-3B to 4B, which is only an example, and may include various types of inclined surfaces.

Figure 11A:
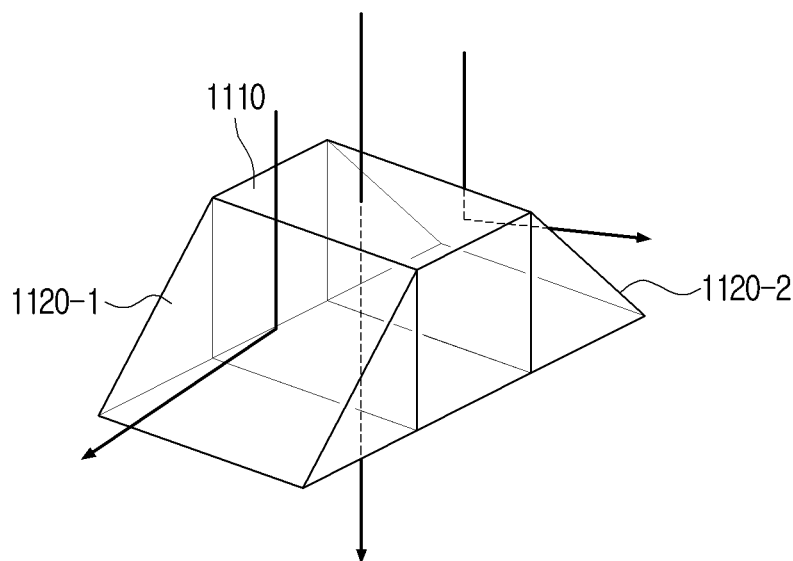
FIG. 11A is a view for explaining the split prism including two inclined surfaces according to other example embodiments.
Figure 11B:
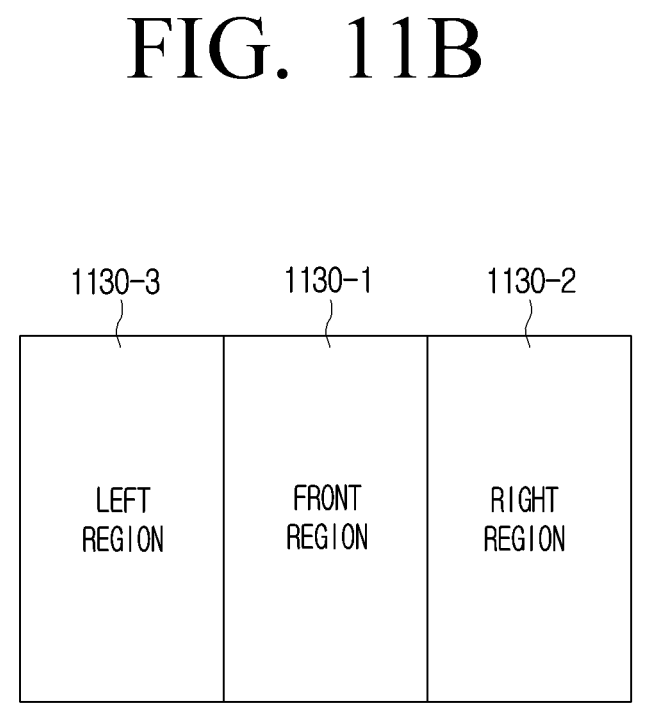
Figure 11C:
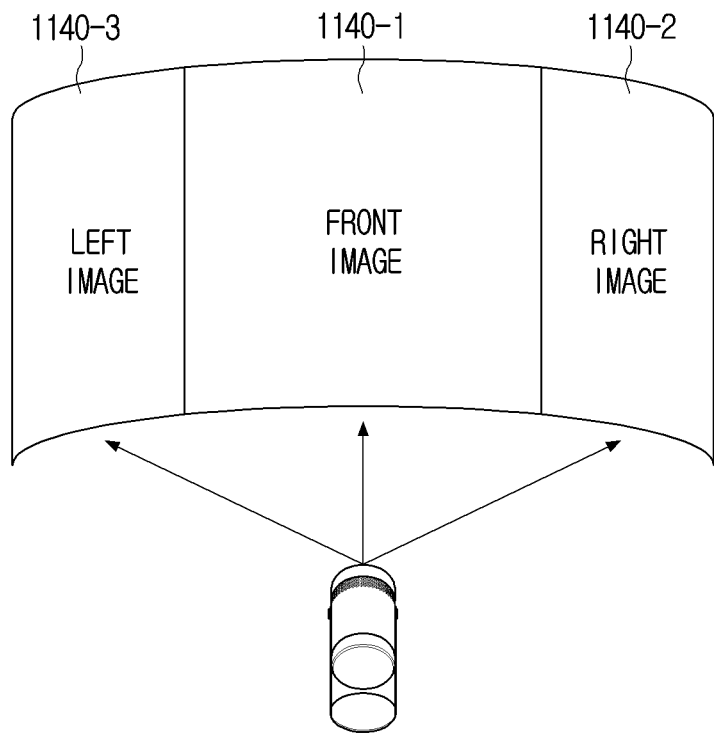
FIG. 11C is a view for explaining the multi-sided image projected to the plurality of projection surfaces by using the split prism including the two inclined surfaces according to other example embodiments.

For example, as shown in FIG. 11A, the split prism 360 may include a hole 1110 positioned in its central region, a first inclined surface 1120-1 positioned in a first lateral direction (e.g., right direction) of the hole 1110, and a second inclined surface 1120-2 positioned in a second lateral direction (e.g., left direction) of the hole 1110. Here, the processor 111 may segment the image corresponding to the received signal into a front region 1130-1, a right region 1130-2, and a left region 1130-3, as shown in FIG. 11B. In addition, the processor 111 may generate the multi-sided image by using the segmented front region 1130-1, right region 1130-2, and left region 1130-3, and project a front image 1140-1, a right image 1140-2, and a left image 1140-3 to the plurality of projection surfaces, as shown in FIG. 11C.

Figure 12A:
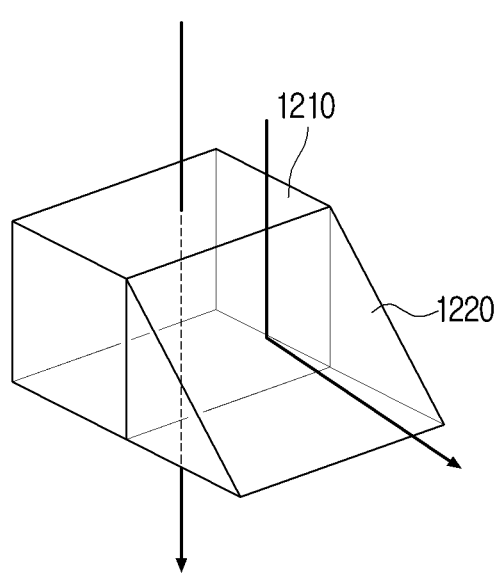
FIG. 12A is a view for explaining a split prism including one inclined surface according to other example embodiments.
Figure 12B:
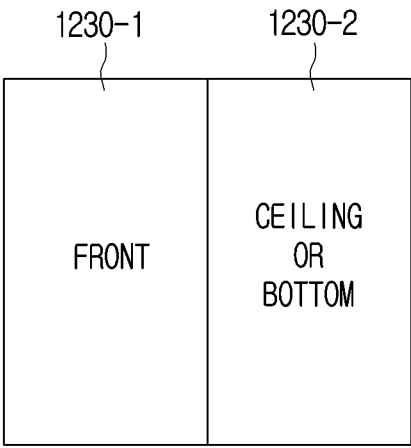
FIG. 12B is a view for explaining a method of segmenting the image corresponding to the received signal by using the split prism including the one inclined surface according to other example embodiments.

For another example, the split prism 360 may include a hole 1210 disposed in a first region and an inclined surface 1220 positioned in a lateral direction of the hole 1210, as shown in FIG. 12A. Here, the processor 111 may segment the image corresponding to the received signal into a front region 1230-1 and a ceiling or bottom region 1230-2, as shown in FIG. 12B.

Figure 13A:
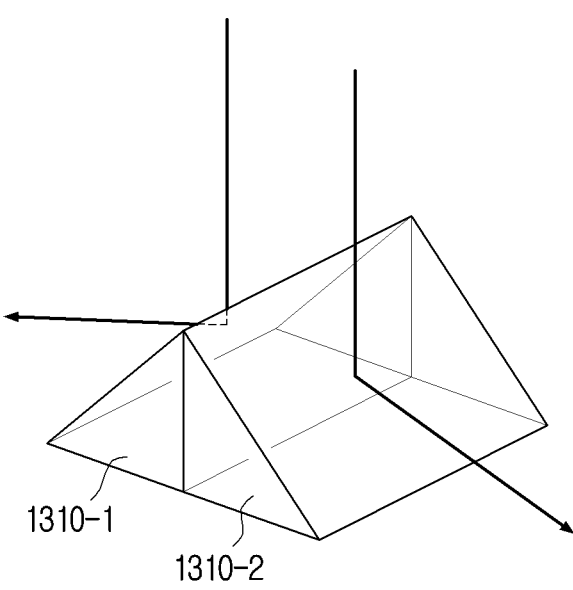
FIG. 13A is a view for explaining a split prism including two inclined surfaces without a hole according to other example embodiments.
Figure 13B:
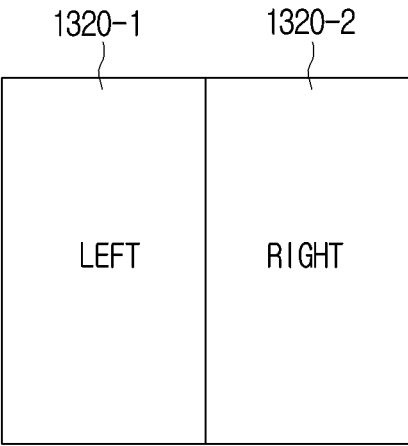
FIG. 13B is a view for explaining a method of segmenting the image corresponding to the received signal by using the split prism including the two inclined surfaces without a hole according to other example embodiments.

For another example, the split prism 360 may include a first inclined surface 1310-1 and a second inclined surface 1310-2 without a separate hole, as shown in FIG. 13A. Here, the processor 111 may segment the image corresponding to the received signal into a left region 1320-1 and a right region 1320-2, as shown in FIG. 13B.

Figure 14A:
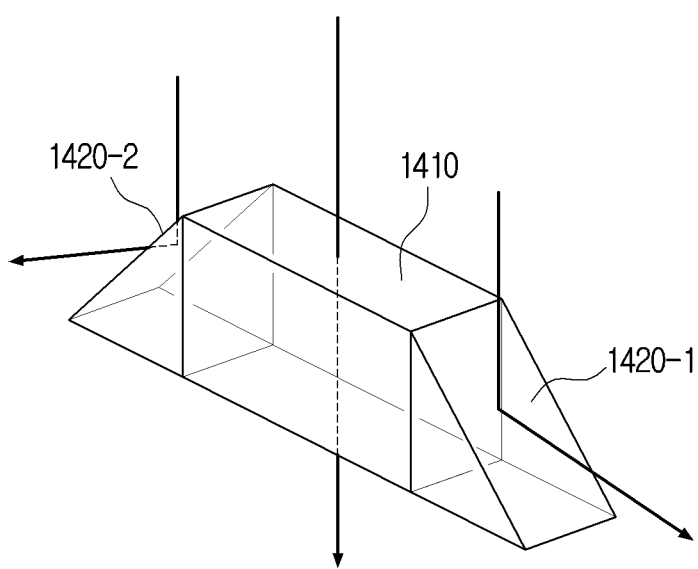
FIG. 14A is a view for explaining the split prism including the two inclined surfaces according to other example embodiments.
Figure 14B:
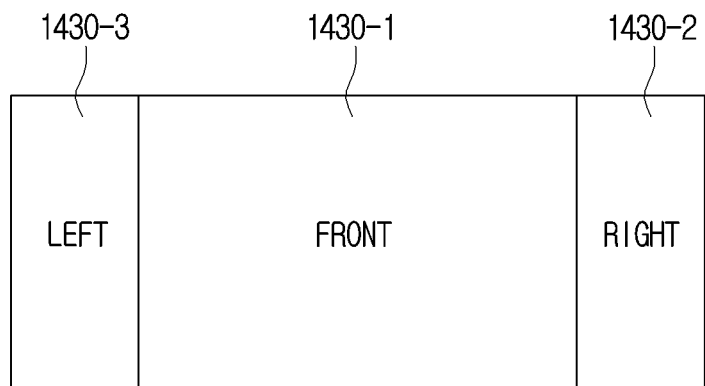
FIG. 14B is a view for explaining a method of segmenting the image corresponding to the received signal by using the split prism including the two inclined surfaces according to other example embodiments.

For another example, as shown in FIG. 14A, the split prism 360 may include a hole 1410 positioned in its central region while having a horizontal length longer than a vertical length, a first inclined surface 1420-1 positioned in a first lateral direction (e.g., right direction) of the hall 1410, and a second inclined surface 1420-2 positioned in a second lateral direction (e.g., left direction) of the hole 1410. That is, the split prism 360 may be a dove prism. Here, the processor 111 may segment the image corresponding to the received signal into a front region 1430-1 having a shape of a rectangle where a horizontal length is longer than a vertical length, a right region 1430-2, and a left region 1430-3, as shown in FIG. 14B. Here, each of the right region 1430-2 and the left region 1430-3 may have a smaller size than that of the front region 1430-1.

Figure 15A:
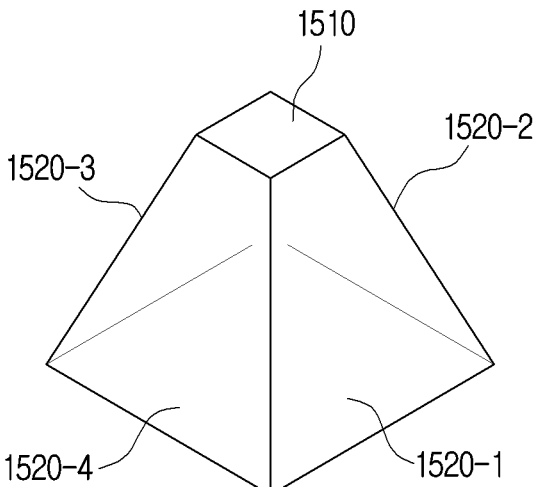
FIG. 15A is a view for explaining a split prism including four inclined surfaces according to other example embodiments.
Figure 15B:
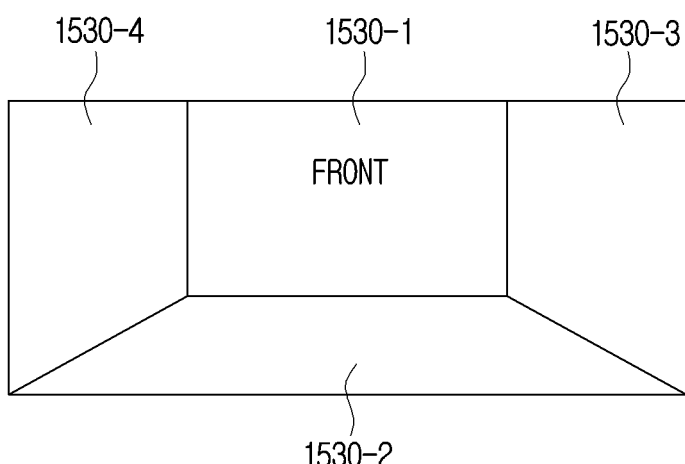
FIG. 15B is a view for explaining a method of segmenting the image corresponding to the received signal into four regions by using the split prism including the four inclined surfaces according to other example embodiments.

For another example, as shown in FIG. 15A, the split prism 360 may be a prism in the form of a truncated pyramid including a hole 1510 positioned in its central region, a first inclined surface 1520-1 positioned in a first lateral direction of the hole 1510, a second inclined surface 1520-2 positioned in a second lateral direction of the hole 1510, a third inclined surface 1520-3 positioned in a third lateral direction of the hole 1510, and a fourth inclined surface 1520-4 positioned in a fourth lateral direction of the hole 1510. Here, as shown in FIG. 15B, the electronic device 100 may segment the image corresponding to the received signal into a front region 1530-1, a bottom region 1530-2, a right region 1530-3, and a left region 1530-4, and generate the multi-sided image by using the segmented front region 1530-1, bottom region 1530-2, right region 1530-3, and left region

Figure 15C:
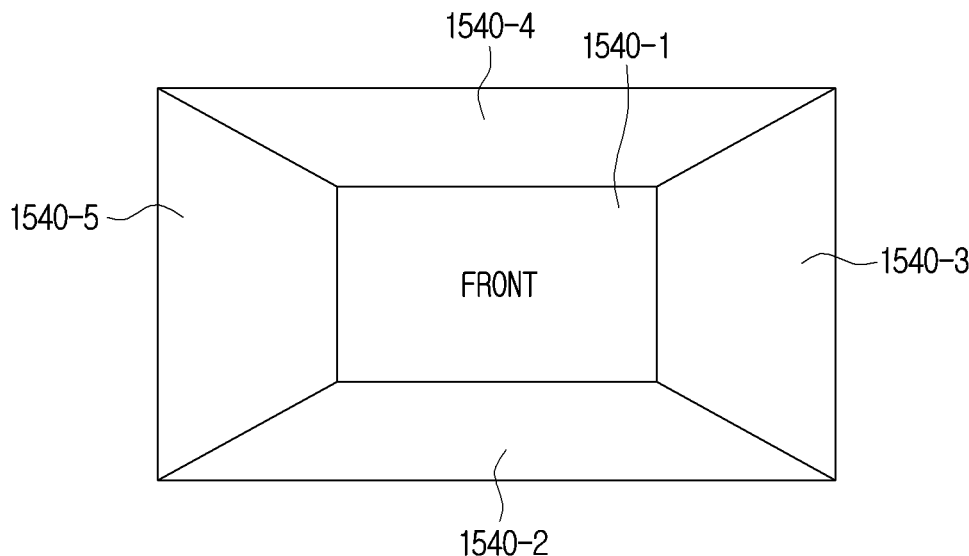
FIG. 15C is a view for explaining a method of segmenting the image corresponding to the received signal into five regions by using the split prism including the four inclined surfaces according to other example embodiments.

1530-4. Alternatively, as shown in FIG. 15C, the electronic device 100 segment the image corresponding to the received signal into a front region 1540-1, a bottom region 1540-2, a right region 1540-3, a ceiling region 1540-4, and a left region 1540-5, and generate the multi-sided image by using the segmented front region 1540-1, bottom region 1540-2, right region 1540-3, ceiling region 1540-4, and left region 1540-5.

Meanwhile, the electronic device 100 may project the multi-sided image to the plurality of projection surfaces by using various types of DMD 340. For example, in case of including the cross-shaped DMD 340 including first to fifth surfaces 1610-1 to 1610-5 as shown in the upper drawing of FIG. 16A, the electronic device 100 may project the multi-sided image to first to fifth projection surfaces 1620-1 to 1620-5 as shown in the lower drawing of FIG. 16A.

Figure 16A:
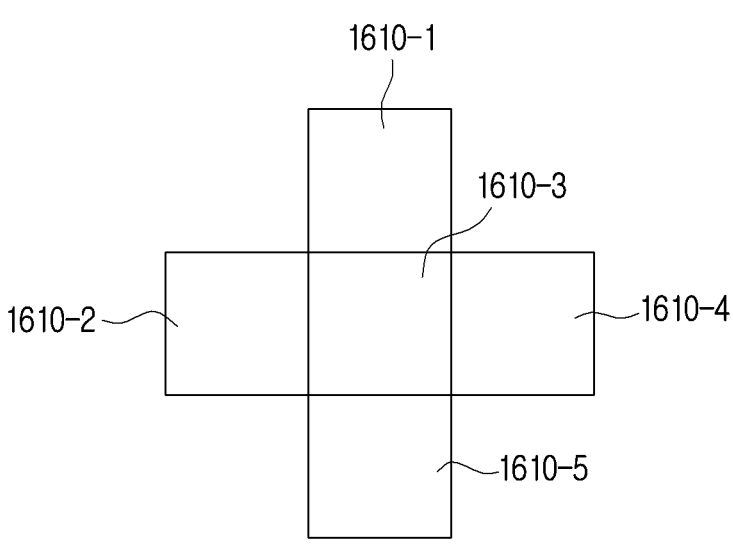
FIG. 16A is a view for explaining an embodiment of projecting the multi-sided image by using a cross-shaped digital micromirror device (DMD) according to one or more example embodiments.
Figure 16A:
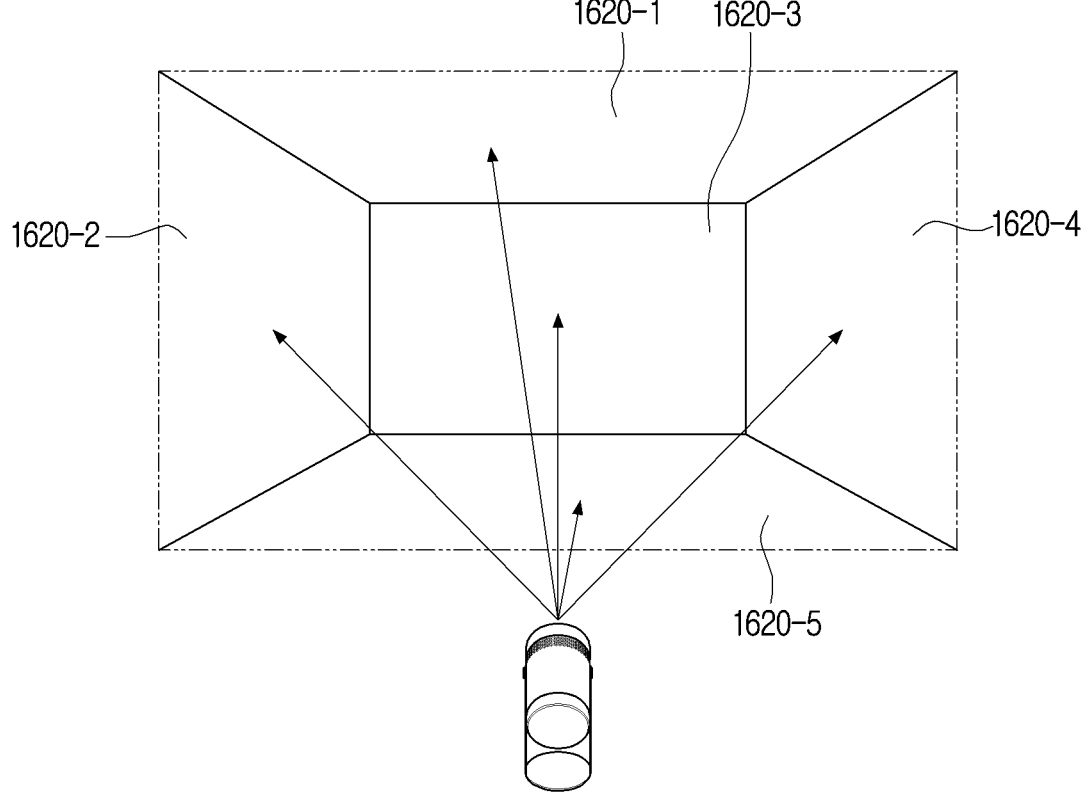
Figure 16B:
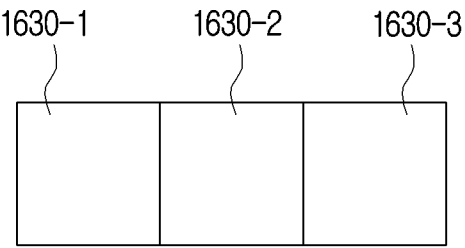
FIG. 16B is a view for explaining an embodiment of projecting the multi-sided image by using a DMD in the form of a wide screen according to one or more example embodiments.
Figure 16B:
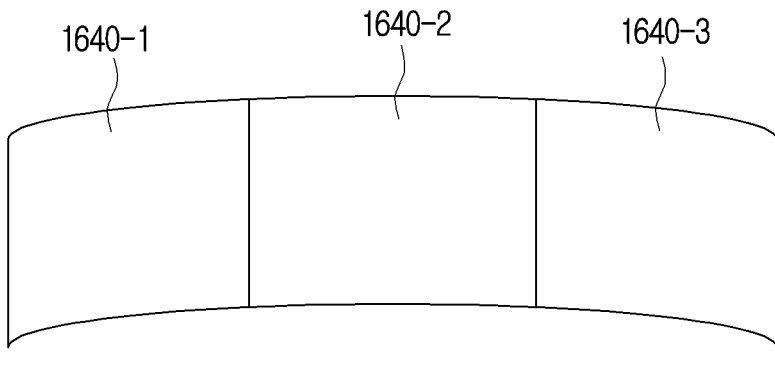
Figure 16B:
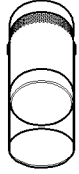

For example, in case of including the DMD 340 in the form of a wide screen including first to third surfaces 1630-1 to 1630-3 each having a shape of a rectangle where a horizontal length is longer than a vertical length, as shown in the upper drawing of FIG. 16B, the electronic device 100 may project the multi-sided image to first to third projection surfaces 1640-1 to 1640-3 each having a shape of the wide screen, as shown in the lower drawing of FIG. 16B.

Figure 16C:
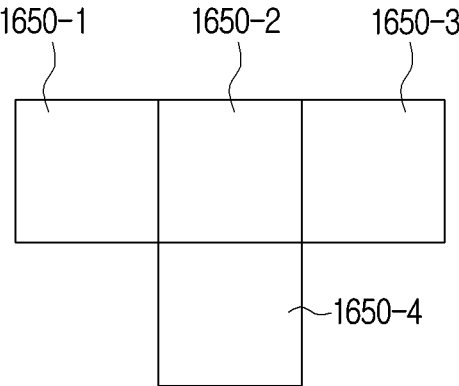
FIG. 16C is a view for explaining an embodiment of projecting the multi-sided image by using a DMD including four faces according to one or more example embodiments.
Figure 16C:
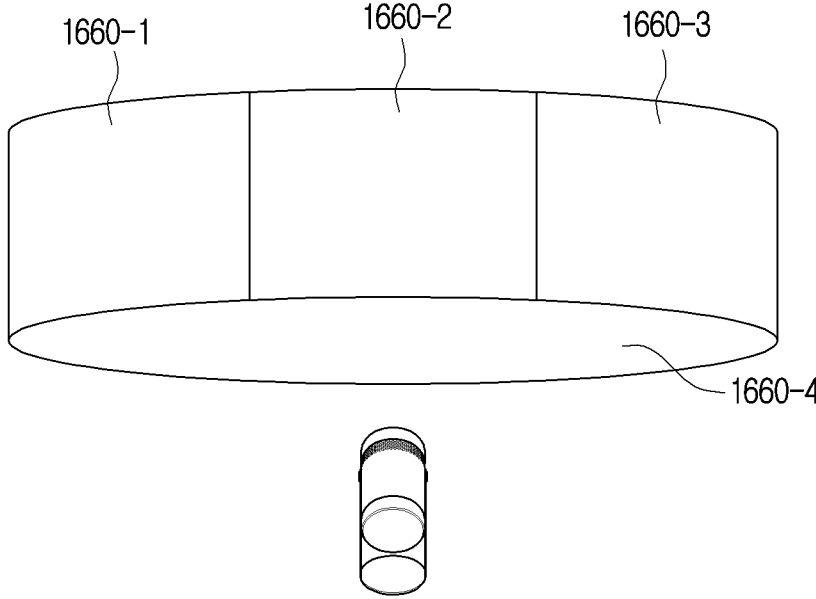

For example, in case of including the DMD 340 of a shape of "T" including first to fourth faces 1650-1 to 1650-4, as shown in the upper drawing of FIG. 16C, the electronic device 100 may project the multi-sided image to first to fourth projection surfaces 1660-1 to 1660-4, as shown in the lower drawing of FIG. 16C.

Here, each shape of the DMD 340 described with reference to FIGS. 16A to 16C may correspond to the shape of the split prism 360. For example, the electronic device 100 including the DMD described with reference to FIG. 16A may include a split prism including four inclined surfaces, as shown in FIG. 3B. For another example, the electronic device 100 including the DMD described with reference to FIG. 16B may include a split prism including two inclined surfaces, as shown in FIG. 11A.

Figure 17:
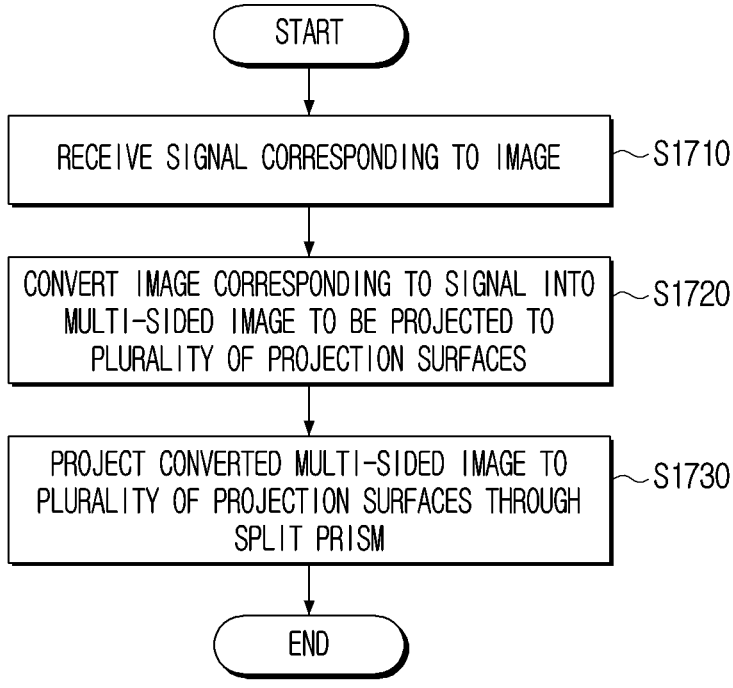
FIG. 17 is a flowchart for explaining a method of projecting the multi-sided image to the plurality of projection surfaces according to one or more example embodiments.

FIG. 17 is a flowchart for explaining a method of projecting the multi-sided image to the plurality of projection surfaces according to one or more example embodiments. Meanwhile, the electronic device 100 according to one or more example embodiments may include the projection part 112, and the projection part 112 may include the split prism transmitting a part of light emitted from a light source in the front direction and reflecting the remaining part of light on at least one inclined surface in the lateral direction. Here, the split prism 360 may include the hole positioned in its central region to transmit a part of light in the front direction, the first inclined surface positioned in the first lateral direction of the hole and reflecting a part of light in the first lateral direction, the second inclined surface positioned in the second lateral direction of the hole and reflecting a part of light in the second lateral direction, the third inclined surface positioned in the third lateral direction of the hole and reflecting a part of light in the third lateral direction, and the fourth inclined surface positioned in the fourth lateral direction of the hole and reflecting a part of light in the fourth lateral direction.

The electronic device 100 may receive the signal corresponding to the image (S1710).

The electronic device 100 may then convert the image corresponding to the received signal into the multi-sided image to be projected to the plurality of projection surfaces (S1720).

Here, the electronic device 100 may segment the image corresponding to the received signal into the plurality of regions. In detail, the electronic device 100 may segment the image corresponding to the received signal into the front region and the first to fourth lateral regions respectively corresponding to the first to fourth lateral directions.

Alternatively, the electronic device 100 may segment the image corresponding to the received signal into the front region and at least one lateral region corresponding to at least one of the first to fourth lateral directions.

In addition, the electronic device 100 may segment the image corresponding to the received signal into the front region and the first to fourth lateral regions respectively corresponding to the first to fourth lateral directions based on the segmented plurality of regions.

Alternatively, the electronic device 100 may segment the image corresponding to the received signal into the front region and at least one lateral region corresponding to at least one of the first to fourth lateral directions. In addition, the electronic device 100 may convert the front region and the first to fourth lateral regions respectively into the front image and the first to fourth lateral images by using at least one conversion matrix. In addition, the electronic device 100 may acquire the multi-sided image including the front image and the first to fourth lateral images.

Alternatively, the electronic device 100 may convert the front region and at least one lateral region respectively into the front image and at least one lateral image by using at least one conversion matrix. In addition, the electronic device 100 may generate one or more lateral images corresponding to the at least one remaining direction among the first to fourth lateral directions based on at least one of the information on the image corresponding to the received signal, the information on another image, or the real-time environment information. In addition, the electronic device 100 may acquire the multi-sided image including the front image, the at least one lateral image and one or more lateral images. Here, the type or display position of the image displayed on one or more lateral images may be changed by the user input.

The electronic device 100 may project the converted multi-sided image to the plurality of projection surfaces through the split prism 360 (S1730).

Meanwhile, the electronic device 100 may operate in one of the first projection mode of projecting the image corresponding to the received signal to the projection surface in the front direction, and the second projection mode of converting the image corresponding to the received signal into the multi-sided image and projecting multi-sided image to the plurality of projection surfaces. In addition, the electronic device 100 may operate in one of the first projection mode and the second projection mode by applying the voltage to a liquid crystal lens 1010 disposed between the split prism 360 and the prism 350 through which light reflected by the DMD 340 passes to adjust the focal length of the liquid crystal lens 1010.

In addition, the electronic device 100 may acquire at least one of the information on the user position, the position of the electronic device 100, or the type of projection surface based on the sensing value acquired by the sensor included in the electronic device 100. In addition, the electronic device 100 may determine the image segmentation type based on at least one of the information on the user position, the position of the electronic device 100, or the type of projection surface.

In addition, the electronic device 100 may acquire the information on the distance between the projection surface and the electronic device 100 based on the sensing value acquired by the sensor included in the electronic device 100. In addition, the electronic device 100 may adjust the sizes of the plurality of images included in the multi-sided image or perform the keystone correction based on the information on the distance between the projection surface and the electronic device 100.

Figure 18:
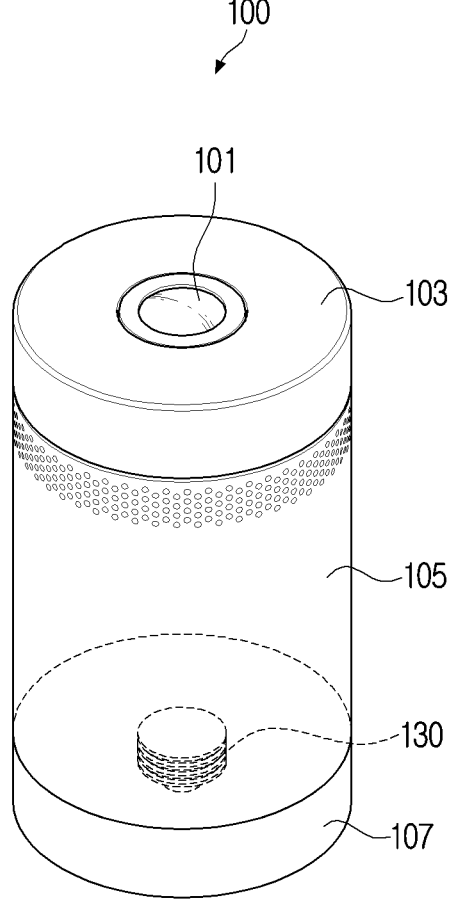
FIG. 18 is a perspective view showing an appearance of a second electronic device according to one or more example embodiments.

FIG. 18 is a perspective view showing an appearance of a second electronic device according to one or more example embodiments.

Referring to FIG. 18, the electronic device 100 may include a projection lens 101, a head 103, a body 105, a cover 107, or a connector 130.

The electronic device 100 may be any of various types of devices. In particular, the electronic device 100 may be a projector device that enlarges and projects an image to a wall or a screen, and the projector device may be a liquid crystal display (LCD) projector or a digital light processing (DLP) type projector that uses a digital micromirror device (DMD).

In addition, the electronic device 100 may be a home or industrial display device, a lighting device used in daily life, an audio device including a sound module, or may be implemented as a portable communication device (e.g., smartphone), a computer device, a portable multimedia device, a wearable device, or a home appliance. Meanwhile, the electronic device 100 according to various example embodiments is not limited to the above-mentioned devices, and may be implemented as the electronic device 100 having two or more functions of the above-mentioned devices. For example, the electronic device 100 may be used as the display device, the lighting device or the audio device while its projector function is turned off and its lighting function or a speaker function is turned on based on a manipulation of the processor, or may be used as an artificial intelligence (AI) speaker including a microphone or the communication device.

The projection lens 101 may be positioned on one surface of the body 105 to project light passing through a lens array to the outside of the body 105. The projection lens 101 according to the various embodiments may be an optical lens low-dispersion coated for reducing chromatic aberration. The projection lens 101 may be a convex lens or a condensing lens, and the projection lens 101 of the various embodiments may adjust a focus by adjusting a position of a plurality of sub-lenses.

The head 103 may be coupled to one surface of the body 105 to support and protect the projection lens 101. The head 103 may be coupled to the body 105 to be swiveled within a predetermined angle range based on one surface of the body 105.

The head 103 may be automatically or manually swiveled by the user or the processor to thus freely adjust a projection angle of the projection lens 101. Alternatively, although not shown in the drawings, the head 103 may be coupled with the body 105, and include a neck extending from the body 105. Accordingly, the head 103 may be tilted backward or forward to adjust the projection angle of the projection lens 101.

Although not shown in FIG. 18, the head 103 may further include a lens in the lateral direction to project the image on the projection surface in the lateral direction.

In addition, the head 103 may be detached from the body 105 of the electronic device 100.

The body 105 is a housing constituting the appearance, and may support or protect components of the electronic device 100 (e.g., components shown in FIG. 19) disposed in the body 105. The body 105 may have a shape close to a cylinder as shown in FIG. 18. However, the shape of the body 105 is not limited thereto, and according to the various example embodiments, the body 105 may be implemented in various geometrical shapes such as a column having polygonal cross sections, a cone, or a sphere.

The body 105 may have a size enabling the body to be gripped or moved by the user with his/her one hand, or may be implemented in a micro size enabling the body to be easily carried or a size enabling the body to be held on a table or to be coupled to the lighting device.

A material of the body 105 may be matt metallic or synthetic resin for the user's fingerprint or dust not to smear the body. Alternatively, the appearance of the body 105 may be made of a slick glossy material.

The body 105 may have a friction region positioned in some regions of the appearance of the body 105 to be gripped and moved by the user. Alternatively, the body 105 may have a bent gripping part or a support 108a (see FIG. 20) positioned in at least some regions to be gripped by the user.

The electronic device 100 may project light or the image to a desired position by adjusting a direction of the head 103 and adjusting the projection angle of the projection lens 101 while the position and angle of the body 105 are fixed. In addition, the head 103 may include a handle that the user may grip after rotating the head in the desired direction.

A plurality of openings may be provided in an outer circumferential surface of the body 105. Through the plurality of openings, audio output from an audio output part may be output to the outside of the body 105 of the electronic device 100. The audio output part may include a speaker, and the speaker may be used for general uses such as reproduction of multimedia or reproduction of recording, and output of a voice.

According to the various example embodiments, the body 105 may include a radiation fan (not shown) provided therein, and in case that the radiation fan (not shown) is driven, air or heat in the body 105 may be discharged through the plurality of openings. Accordingly, the electronic device 100 may discharge heat occurring due to the driving of the electronic device 100 to the outside, and prevent or reduce overheating of the electronic device 100.

The connector 130 may connect the electronic device 100 with the external device to transmit or receive electronic signals, or receive power from the external device. The connector 130 according to the various example embodiments may be physically connected with the external device. Here, the connector 130 may include an input/output interface to connect its communication with the external device in a wired or wireless manner or receive the power from the external device. For example, the connector 130 may include a high-definition multimedia interface (HDMI) connection terminal, a universal serial bus (USB) connection terminal, a secure digital (SD) card accommodating groove, an audio connection terminal, or a power consent. Alternatively, the connector 130 may include a Bluetooth, wireless-fidelity (Wi-Fi), or wireless charge connection module, connected with the external device in the wireless manner.

In addition, the connector 130 may have a socket structure connected to an external lighting device, and may be connected to a socket accommodating groove of the external lighting device to receive power. The size and specification of the connector 130 having the socket structure may be implemented in various ways in consideration of an accommodating structure of the external device that may be coupled thereto. For example, a diameter of a joining portion of the connector 130 may be 26 mm according to an international standard E26, and in this case, the electronic device 100 may be coupled to the external lighting device such as a stand in place of a light bulb that is generally used. Meanwhile, in case of being coupled to a conventional socket positioned on a ceiling, the electronic device 100 may perform vertical projection. In this case, a screen cannot be rotated either because the electronic device 100 is not rotated by being coupled to the socket. Accordingly, the electronic device 100 may project or rotate the screen to the desired position while being socket-coupled to a stand on the ceiling by allowing the head 103 to swivel on one surface of the body 105 to have an adjusted projection angle for the electronic device 100 to be rotated even in case of being socket-coupled and receiving power.

The connector 130 may include a coupling sensor, and the coupling sensor may detect whether the connector 130 is coupled to the external device, its coupling state, or its coupling target, and transmit the same to the processor, and the processor 111 may control the driving of the electronic device 100 based on a received sensing value.

The cover 107 may be detached from the body 105, and protect the connector 130 for the connector 130 not to be always exposed to the outside. The cover 107 may have a shape continued from the shape of the body 105 as shown in FIG. 1, or may be implemented to correspond to the shape of the connector 130. The cover 107 may support the electronic device 100, and the electronic device 100 may be used by being coupled to or held on an external holder while being coupled to the cover 107.

In the electronic device 100 according to the various example embodiments, a battery may be positioned inside the cover 107. The battery may include, for example, a primary cell that cannot be recharged, a secondary cell that may be recharged, or a fuel cell.

Although not shown in the drawings, the electronic device 100 may include a camera module, and the camera module may capture a still image or a video. According to the various embodiments, the camera module may include at least one lens, an image sensor, an image signal processor, or a flash.

Although not shown in the drawings, the electronic device 100 may include a protection case (not shown) for the electronic device 100 to be easily carried while being protected. Alternatively, the electronic device 100 may include a stand (not shown) that supports or fixes the body 105, or a bracket (not shown) that may be coupled to a wall surface or a partition.

In addition, the electronic device 100 may be connected with the various external devices by using its socket structure, and provide various functions. The electronic device 100 according to the various embodiments may be connected with an external camera device by using the socket structure. The electronic device 100 may provide an image stored in the camera device connected thereto or an image currently being captured by using the projection part 112. According to other embodiments, the electronic device 100 may be connected to a battery module by using the socket structure to receive power. Meanwhile, the electronic device 100 may be connected to the external device by using the socket structure, which is only an example, and may be connected to the external device by using another interface (e.g., USB).

Figure 19:
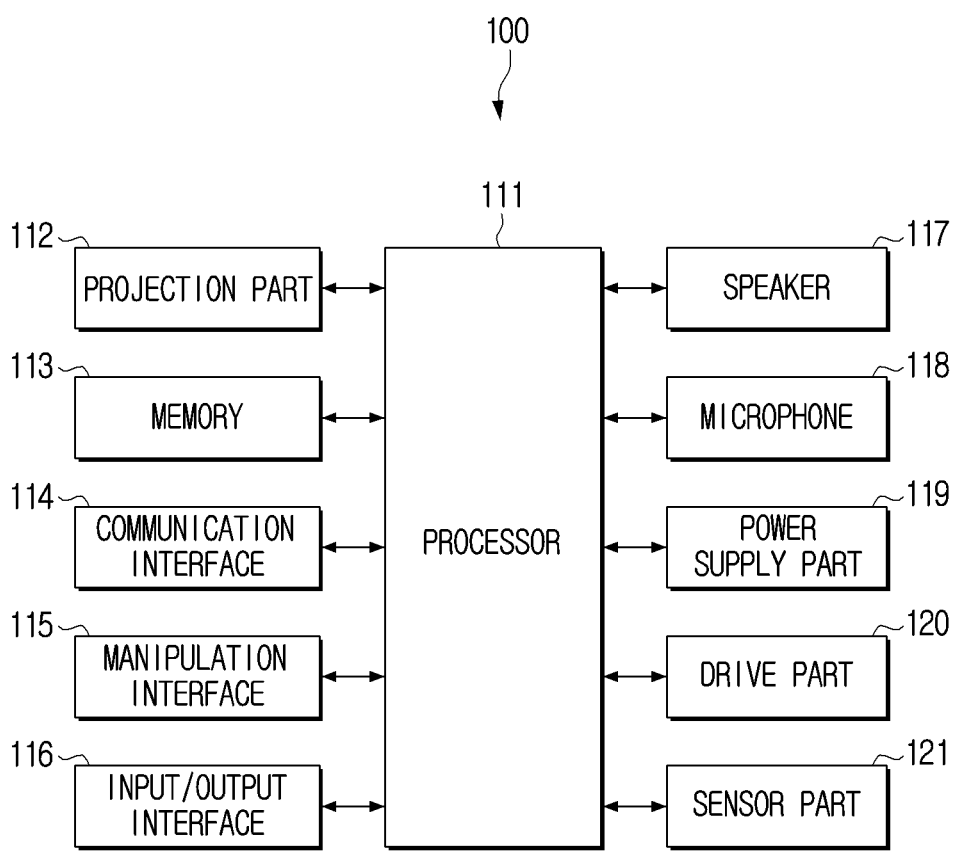
FIG. 19 is a block diagram specifically showing a configuration of the second electronic device according to one or more example embodiments.

FIG. 19 is a block diagram specifically showing a configuration of the electronic device 100 according to one or more example embodiments.

Referring to FIG. 19, the electronic device 100 may include at least one of the processor 111, the projection part 112, the memory 113, the communication interface 114, a manipulation interface 115, the input/output interface 116, a speaker 117, a microphone 118, a power supply part 119, a drive part 120, or a sensor part 121.

Meanwhile, the configuration shown in FIG. 19 is only one of various embodiments, from which some configurations may thus be omitted, and to which a new configuration may be added.

Meanwhile, the details already described with reference to FIG. 2 are omitted.

The processor 111 may be implemented as a digital signal processor (DSP) that processes a digital signal, a microprocessor, or a time controller (TCON). However, the processor is not limited thereto, and may include one or more of the central processing unit (CPU), a micro controller unit (MCU), a micro processing unit (MPU), a controller, the application processor (AP), the graphics-processing unit (GPU), a communication processor (CP) or an advanced reduced instruction set computer (RISC) machines (ARM) processor, or may be defined by these terms. In addition, the processor 111 may be implemented in the system-on-chip (SoC) or a large scale integration (LSI) in which the processing algorithm is embedded, or may be implemented in the form of the field programmable gate array (FPGA). In addition, the processor 111 may perform various functions by executing computer executable instructions stored in the memory 113.

The projection part 112 is a component that projects the image to the outside. The projection part 112 according to the various example embodiments may be implemented in various projection types (e.g., cathode-ray tube (CRT) type, liquid crystal display (LCD) type, digital light processing (DLP) type, or laser type). For example, the CRT type has basically the same principle as the principle of a CRT monitor. The CRT type may display the image on the screen by expanding the image by using a lens in front of a cathode-ray tube (CRT). According to the number of cathode-ray tubes, the CRT type is divided into a one-tube type and a three-tube type, and the three-tube type may be implemented while cathode-ray tubes of red, green, and blue are separated from one another.

For another example, the LCD type may display the image by allowing light emitted from the light source to transmit through a liquid crystal. The LCD type may be divided into a single-panel type and a three-panel type. In case of the three-panel type, light emitted from the light source may be separated into red, green and blue in a dichroic mirror (which is a mirror that reflects only light of a specific color and allows the rest to pass therethrough), may then pass through the liquid crystal, and may then be collected into one place again.

For another example, the DLP type may display the image by using a digital micromirror device (DMD) chip. The DLP type projection part may include the light source, a color wheel, the DMD chip, the projection lens, or the like. Light output from the light source may be colored as light passes through the rotating color wheel. Light passed through the color wheel may be input into the DMD chip. The DMD chip may include numerous micromirrors and reflect light input to the DMD chip. The projection lens may expand light reflected from the DMD chip to the image size.

For another example, the laser type may include a diode pumped solid state (DPSS) laser and a galvanometer. The laser type that outputs various colors may use a laser in which three DPSS lasers are respectively installed for red, green, and blue (RGB) colors, and their optical axes overlap with each other by using a special mirror. The galvanometer may include a mirror and a high-power motor, and move the mirror at a high speed. For example, the galvanometer may rotate the mirror at up to 40 KHz/sec. The galvanometer may be mounted in a scanning direction, and in general, a projector performs planar scanning, and the galvanometer may thus also be disposed by being divided into x and y axes.

Meanwhile, the projection part 112 may include various types of light sources. For example, the projection part 112 may include at least one light source of a lamp, a light emitting diode (LED) or a laser.

The projection part 112 may output the image in a screen ratio of 4:3, a screen ratio of 5:4, and a wide screen ratio of 16:9, based on a purpose of the electronic device 100, the user's setting or the like, and may output the image having various resolutions such as wide video graphics array WVGA (854*48 pixels), super video graphics array SVGA (800*600 pixels), eXtended graphics array XGA (1024*768 pixels), wide extended graphics array WXGA (1280*720 pixels), WXGA (1280*800 pixels), super extended graphics array SXGA (1280*1024 pixels), ultra extended graphics array UXGA (1600*1200 pixels) and full high-definition HD (1920*1080 pixels), based on the screen ratio.

Meanwhile, the projection part 112 may perform the various functions for adjusting the output image under control of the processor 111. For example, the projection part 112 may perform the zoom function, the keystone function, the quick corner (or four corner) keystone function, the lens shift function, or the like.

In detail, the projection part 112 may enlarge or reduce the image based on its distance (e.g., projection distance) to the screen. That is, the projection part 112 may perform the zoom function based on the distance from the screen. Here, the zoom function may include a hardware method in which a size of the screen is adjusted by moving a lens and a software method in which the size of the screen is adjusted by cropping the image or the like. Meanwhile, in case that the zoom function is performed, it is necessary to adjust a focus of the image. For example, a method of adjusting the focus may include a manual focusing method, an electric focusing method, etc. The manual focusing method may indicate a method of manually adjusting the focus, and the electric focusing method may indicate a method in which the projector automatically adjusts the focus by using a motor embedded therein when the zoom function is performed. In case of performing the zoom function, the projection part 112 may provide a digital zoom function through software, and may provide an optical zoom function in which the zoom function is performed by moving the lens by using the drive part 120.

In addition, the projection part 112 may perform the keystone correction function. In case that a height does not match a front projection, the screen may be distorted up or down. The keystone correction function may be a function to correct the distorted screen. For example, in case that the distortion occurs on the screen in a horizontal direction, the distortion may be corrected using a horizontal keystone, and in case that the distortion occurs on the screen in a vertical direction, the distortion may be corrected using a vertical keystone. The quick corner (e.g., four corner) keystone correction function may be a function to correct the screen in case that a central region of the screen is normally balanced and its corner regions are unbalanced. The lens shift function may be a function to move the screen as it is in case that the screen is off the screen frame.

Meanwhile, the projection part 112 may provide the zoom/keystone/focus functions by automatically analyzing a surrounding environment and a projection environment without the user input. In detail, the projection part 112 may automatically provide the zoom/keystone/focusing functions, based on a distance between the electronic device 100 and the screen, information on a space where the electronic device 100 is currently positioned, information on an amount of ambient light, or the like, detected by the sensor (e.g., depth camera, distance sensor, infrared sensor, or illuminance sensor).

In addition, the projection part 112 may provide a lighting function by using the light source. In particular, the projection part 112 may provide the lighting function by outputting the light source by using the LED. The projection part 112 according to the various embodiments may include one LED, and the electronic device 100 according to other embodiments may include the plurality of LEDs. Meanwhile, the projection part 112 may output the light source by using a surface-emitting LED in an implementation example. Here, the surface-emitting LED may be an LED in which an optical sheet is disposed on an upper side of the LED for the light source to be evenly distributed and output. In detail, in case that the light source is output through the LED, the light source may be evenly distributed through the LED, the light source may be evenly distributed through the optical sheet and the light source dispersed through the optical sheet may be incident on a display panel.

Meanwhile, the projection part 112 may provide the user with a dimming function to adjust intensity of the light source. In detail, in case of receiving the user input for adjusting the intensity of the light source from the user through the manipulation interface 115 (e.g., touch display button or dial), the projection part 112 may control the LED to output the intensity of the light source corresponding to the received user input.

In addition, the projection part 112 may provide the dimming function based on a content analyzed by the processor 111 without the user input. In detail, the projection part 112 may control the LED to output the intensity of the light source based on information (e.g., content type or content brightness) on the currently-provided content.

Meanwhile, the projection part 112 may control a color temperature by the control of the processor 111. Here, the processor 111 may control the color temperature based on the content. In detail, in case that the content is identified to be output, the processor 111 may acquire color information on each frame of the content whose output is determined. In addition, the processor 111 may control the color temperature, based on the acquired color information for each frame. Here, the processor 111 may acquire at least one main color of the frame based on the color information for each frame. In addition, the processor 111 may adjust the color temperature based on the acquired color information for each frame. For example, the color temperature that the processor 111 may adjust may be classified into a warm type or a cold type. Here, the frame to be output (hereinafter, output frame) may include a fire scene. The processor 111 may identify (or acquire) that the main color is red based on the color information included in the current output frame. In addition, the processor 111 may identify the color temperature corresponding to the identified main color (e.g., red). Here, the color temperature corresponding to the red color may be the warm type. Meanwhile, the processor 111 may use an artificial intelligence (AI) model to acquire the color information or main color of the frame. According to the various embodiments, the artificial intelligence model may be stored in the electronic device 100 (e.g., memory 113). According to other embodiments, the artificial intelligence model may be stored in an external server capable of communicating with the electronic device 100.

The memory 113 may be implemented as an internal memory included in the processor 111 such as a read only memory (ROM) (e.g., electrically erasable programmable read-only memory (EEPROM)) or a random access memory (RAM), or a memory separate from the processor 111. In this case, the memory 113 may be implemented in the form of a memory embedded in the electronic device 100, or may be implemented in the form of a memory detachable from the electronic device 100, based on a data storing purpose. For example, data for driving the electronic device 100 may be stored in the memory embedded in the electronic device 100, and data for an extension function of the electronic device 100 may be stored in the memory detachable from the electronic device 100.

Meanwhile, the memory embedded in the electronic device 100 may be implemented as at least one of a volatile memory (e.g., dynamic RAM (DRAM), static RAM (SRAM) or synchronous dynamic RAM (SDRAM)), a non-volatile memory (e.g., one time programmable ROM (OT-PROM), programmable ROM (PROM), erasable and programmable ROM (EPROM), electrically erasable and programmable ROM (EEPROM)), a mask ROM, a flash ROM, a flash memory (e.g., NAND flash, NOR flash or the like), a hard drive, or a solid state drive (SSD); and the memory detachable from the electronic device 100 may be implemented as a memory card (e.g., compact flash (CF), secure digital (SD), micro secure digital (Micro-SD), mini secure digital (mini-SD), extreme digital (xD), multi-media card (MMC) or the like), an external memory (e.g., USB memory) which may be connected to a universal serial bus (USB) port, or the like.

The memory 113 may store at least one instruction on the electronic device 100. In addition, the memory 113 may store an operating system (O/S) for driving the electronic device 100. In addition, the memory 113 may store various software programs or applications for operating the electronic device 100 according to the various example embodiments. In addition, the memory 113 may include a semiconductor memory such as a flash memory, or a magnetic storing medium such as a hard disk.

In detail, the memory 113 may store various software modules for operating the electronic device 100 according to the various example embodiments, and the processor 111 may allow the various software modules stored in the memory 113 to be executed to control an operation of the electronic device 100. That is, the memory 113 may be accessed by the processor 111, and readout, recording, correction, deletion, update and the like of data may be performed by the processor 111.

Meanwhile, the term "memory 113" in the disclosure may include a memory device, a read only memory (ROM, not shown) or a random access memory (RAM, not shown), in the processor 111, or a memory card (not shown, and for example, a micro secure digital (SD) card or a memory stick) mounted on the electronic device 100.

The communication interface 114 is a component communicating with various types of external devices by using various types of communication methods. The communication interface 114 may include a wireless communication module and a wired communication module. Here, each communication module may be implemented in the form of at least one hardware chip.

The wireless communication module, comprising communication circuitry, may be a module communicating with the external device in a wireless manner. For example, the wireless communication module may include at least one of a wireless-fidelity (Wi-Fi) module, a Bluetooth module, an infrared communication module, or other communication modules.

The Wi-Fi module and the Bluetooth module may respectively perform communication in a Wi-Fi manner and a Bluetooth manner. In case of using the Wi-Fi module or the Bluetooth module, the communication interface 114 may first transmit and receive various connection information such as a service set identifier (SSID) or a session key, connect the communication by using this connection information, and then transmit and receive various information.

The infrared communication module may perform the communication based on infrared data association (IrDA) technology that wirelessly transmits data in a short distance using an infrared ray between visible and millimeter waves.

In addition to the above-described communication manners, other communication modules may include at least one communication chip performing the communication based on various wireless communication standards such as Zig-bee, third generation (3G), 3rd generation partnership project (3GPP), long term evolution (LTE), LTE advanced (LTE-A), 4th generation (4G), and 5th generation (5G).

The wired communication module may be a module communicating with the external device in the wired manner. For example, the wired communication module may include at least one of a local area network (LAN) module, an Ethernet module, a pair cable, a coaxial cable, an optical fiber cable, or an ultra wide-band (UWB) module.

The manipulation interface 115 may include various types of input devices. For example, the manipulation interface 115 may include a physical button. Here, the physical button may include a function key, a direction key (e.g., a four-direction key), or a dial button. According to the various embodiments, the physical button may be implemented as a plurality of keys. According to other embodiments, the physical button may be implemented as one key. Here, in case that the physical button is implemented as one key, the electronic device 100 may receive the user input in which the one key is pressed for a critical time or longer. In case of receiving the user input in which the one key is pressed for the critical time or longer, the processor 111 may perform a function corresponding to the user input. For example, the processor 111 may provide the lighting function based on the user input.

In addition, the manipulation interface 115 may receive the user input by using a non-contact method. To receive the user input by using a contact method, a physical force may be required to be transmitted to the electronic device 100. There may thus be a need for a method of controlling the electronic device 100 regardless of the physical force. In detail, the manipulation interface 115 may receive a user gesture and may perform an operation corresponding to the received user gesture. Here, the manipulation interface 115 may receive the user gesture by using the sensor (e.g., image sensor or infrared sensor).

In addition, the manipulation interface 115 may receive the user input by using a touch method. For example, the manipulation interface 115 may receive the user input by using a touch sensor. According to the various embodiments, the touch method may be implemented as the non-contact method. For example, the touch sensor may determine whether a user body approaches within a critical distance. Here, the touch sensor may identify the user input even in case that the user does not touch the touch sensor. Meanwhile, according to another implementation example, the touch sensor may identify the user input by which the user touches the touch sensor.

Meanwhile, the electronic device 100 may receive the user input in various ways other than the manipulation interface described above. According to the various embodiments, the electronic device 100 may receive the user input from an external remote control device. Here, the external remote control device may be a remote control device corresponding to the electronic device 100 (e.g., control device dedicated to the electronic device 100) or the portable communication device (e.g., smartphone or wearable device) of the user. Here, the portable communication device of the user may store an application for controlling the electronic device 100. The portable communication device may acquire the user input from an application stored therein, and transmit the acquired user input to the electronic device 100. The electronic device 100 may receive the user input from the portable communication device, and perform an operation corresponding to the user's control command Meanwhile, the electronic device 100 may receive the user input by using voice recognition. According to the various embodiments, the electronic device 100 may receive a user voice from the microphone included in the electronic device 100. According to other embodiments, the electronic device 100 may receive the user voice from the microphone or the external device. In detail, the external device may acquire the user voice by using the microphone of the external device, and transmit the acquired user voice to the electronic device 100. The user voice transmitted from the external device may be audio data or digital data converted from audio data (e.g., audio data converted into a frequency domain). Here, the electronic device 100 may perform an operation corresponding to the received user voice. In detail, the electronic device 100 may receive the audio data corresponding to the user voice by using the microphone. In addition, the electronic device 100 may convert the received audio data into the digital data. In addition, the electronic device 100 may convert the converted digital data into text data by using a speech-to-text (STT) function. According to the various embodiments, the speech-to-text (STT) function may be directly performed by the electronic device 100.

According to other embodiments, the speech-to-text (STT) function may be performed by the external server. The electronic device 100 may transmit the digital data to the external server. The external server may convert the digital data into the text data, and acquire control command data based on the converted text data. The external server may transmit the control command data (which may here also include the text data) to the electronic device 100. The electronic device 100 may perform an operation corresponding to the user voice based on the acquired control command data.

Meanwhile, the electronic device 100 may provide a voice recognition function by using one assistance (or AI assistant such as Bixby™), which is only one of the various embodiments, and may provide the voice recognition function by using a plurality of assistants. Here, the electronic device 100 may provide the voice recognition function by selecting one of the plurality of assistances based on a trigger word corresponding to the assistance or a specific key included in a remote controller.

Meanwhile, the electronic device 100 may receive the user input by using a screen interaction. The screen interaction may refer to a function in which the electronic device 100 identifies whether a predetermined event is generated based on the image projected to the screen (or projection surface), and acquires the user input based on the predetermined event. Here, the predetermined event may be an event in which a predetermined object is identified at a specific position (e.g., position to which a user interface (UI) for receiving the user input is projected). Here, the predetermined object may include at least one of a user body part (e.g., finger), a pointer, or a laser point. In case that the predetermined object is identified at the position corresponding to the projected UI, the electronic device 100 may identify that the electronic device 100 receives the user input for selecting the projected UI. For example, the electronic device 100 may project a guide image displaying the UI on the screen. In addition, the electronic device 100 may identify whether the user selects the projected UI. In detail, the electronic device 100 may identify that the user selects the projected UI in case that the predetermined event is identified at the position of the projected UI. Here, the projected UI may include at least one item. Here, the electronic device 100 may perform spatial analysis to identify whether the predetermined event is generated at the position of the projected UI. Here, the electronic device 100 may perform the spatial analysis by using the sensor (e.g., image sensor, infrared sensor, depth sensor or distance sensor). The electronic device 100 may identify whether the predetermined event is generated at the specific position (to which the UI is projected) by performing the spatial analysis. In addition, in case that it is identified that the predetermined event is generated at the specific position (e.g., position to which the UI is projected), the electronic device 100 may identify that the electronic device 100 receives the user input for selecting the UI corresponding to the specific position.

The input/output interface 116 is a component inputting or outputting at least one of an audio signal or an image signal. The input/output interface 116 may receive at least one of the audio signal or the image signal from the external device, and output the control command to the external device.

In an implementation example, the input/output interface 116 may be implemented as an interface for inputting and outputting only the audio signal, an interface for inputting and outputting only the image signal, or one interface for inputting and outputting both the audio signal and the image signal.

Meanwhile, the input/output interface 116 in the various example embodiments may be implemented as a wired input/output interface of at least one of the high-definition multimedia interface (HDMI), a mobile high-definition link (MHL), the universal serial bus (USB), a USB C-type, a display port (DP), a thunderbolt, a video graphics array (VGA) port, a red-green-blue (RGB) port, a D-subminiature (D-SUB), or a digital visual interface (DVI). According to the various embodiments, the wired input/output interface may be implemented as an interface for inputting and outputting only the audio signal, an interface for inputting and outputting only the image signal, or one interface for inputting and outputting both the audio signal and the image signal.

In addition, the electronic device 100 may receive the data through the wired input/output interface, which is only one of the various embodiments, and receive power through the wired input/output interface. For example, the electronic device 100 may receive power from an external battery through the USB C-type, or receive power from an outlet through a power adapter. For another example, the electronic device 100 may receive power from the external device (e.g., laptop computer or monitor) by using the display port (DP).

Meanwhile, the audio signal may be input through the wired input/output interface, and the image signal may be input through the wireless input/output interface (or the communication interface). Alternatively, the audio signal may be input through the wireless input/output interface (or the communication interface), and the image signal may be input through the wired input/output interface.

The speaker 117 is a component outputting the audio signal. In particular, the speaker 117 may include an audio output mixer, an audio signal processor, or an audio output module. The audio output mixer may synthesize the plurality of audio signals to be output as at least one audio signal. For example, the audio output mixer may synthesize an analog audio signal and another analog audio signal (e.g., analog audio signal received from the outside) as at least one analog audio signal. The audio output module may include the speaker or an output terminal. According to the various embodiments, the audio output module may include the plurality of speakers. In this case, the audio output module may be disposed in the body, and audio emitted while covering at least a portion of a diaphragm of the audio output module may pass through a waveguide to be transmitted to the outside of the body. The audio output module may include a plurality of audio output units, and the plurality of audio output units may be symmetrically arranged on the appearance of the body, and accordingly, the audio may be emitted to all directions, e.g., all directions in 360 degrees.

The microphone 118 is a component receiving the user voice or other sounds and converting the same into the audio data. The microphone 118 may receive the user voice in case of being activated. For example, the microphone 118 may be integrated with the electronic device 100 in the upper, front, or lateral direction of the electronic device 100. The microphone 118 may include various components such as a microphone collecting the user voice in an analog form, an amplifier circuit amplifying the collected user voice, an analog to digital (AID) converter circuit sampling the amplified user voice and converting the same into a digital signal, and a filter circuit removing a noise component from the converted digital signal.

The power supply part 119 may receive power from the outside and supply power to the various components of the electronic device 100. The power supply part 119 according to the various example embodiments may receive power by using various methods. The power supply part 119 according to the various embodiments may receive power by using the connector 130 (e.g., see FIG. 18). In addition, the power supply part 119 may receive power by using a direct current (DC) power cord of 220V. However, the disclosure is not limited thereto, and the electronic device 100 may receive power by using a USB power cord or receive power by using a wireless charging method.

In addition, the power supply part 119 may receive power by using an internal battery or the external battery. The power supply part 119 according to the various example embodiments may receive power through the internal battery. For example, the power supply part 119 may charge power of the internal battery by using at least one of the DC power cord of 220V, the USB power cord, or a USB C-Type power cord, and may receive power through the charged internal battery. In addition, the power supply part 119 according to the various example embodiments may receive power through the external battery. For example, in case that the electronic device 100 and the external battery are connected to each other by using various wired communication methods such as the USB power cord, the USB C-Type power cord, and a socket groove, the power supply part 119 may receive power from the external battery. That is, the power supply part 119 may directly receive power from the external battery, or charge the internal battery by using the external battery and receive power from the charged internal battery.

The power supply part 119 may receive power by using at least one of the above-mentioned plurality of power supplying methods.

Meanwhile, with respect to power consumption, the electronic device 100 may have power consumption of a predetermined value (e.g., 43W) or less due to a socket type, another standard, etc. Here, the electronic device 100 may change the power consumption to reduce the power consumption in case of using the battery. That is, the electronic device 100 may change the power consumption based on the power supply method and power usage.

The drive part 120 may drive at least one hardware component included in the electronic device 100. The drive part 120 may generate the physical force and transmit the same to at least one hardware component included in the electronic device 100.

Here, the drive part 120 may generate drive power to move the hardware component included in the electronic device 100 (e.g., to move the electronic device 100) or rotate a component (e.g., rotate the projection lens).

The drive part 120 may adjust the projection direction (or projection angle) of the projection part 112. In addition, the drive part 120 may move the position of the electronic device 100. Here, the drive part 120 may control a moving member 109 to move the electronic device 100. For example, the drive part 120 may control the moving member 109 (e.g., see FIG. 25) by using a motor.

The sensor part 121 may include at least one sensor. In detail, the sensor part 121 may include at least one of an inclination sensor for sensing the inclination of the electronic device 100 or an image sensor for capturing the image. Here, the inclination sensor may be an accelerometer or a gyro sensor, and an image sensor may be a camera or a depth camera. Meanwhile, the inclination sensor may be described as a movement sensor. In addition, the sensor part 121 may include various sensors other than the inclination sensor or the image sensor. For example, the sensor part 121 may include the illuminance sensor or the distance sensor. The distance sensor may be a time of flight (ToF) sensor. The sensor part 121 may also include a light detection and ranging (LiDAR) sensor.

Meanwhile, the electronic device 100 may be linked with the external device to control the lighting function. In detail, the electronic device 100 may receive lighting information from the external device. Here, the lighting information may include at least one of brightness information or color temperature information, set by the external device. Here, the external device may be a device connected to the same network as the electronic device 100 (e.g., internet of things (IoT) device included in the same home/work network) or a device not connected to the same network as the electronic device 100 but capable of communicating with the electronic device 100 (e.g., remote control server). For example, an external lighting device (e.g., IoT device) included in the same network as the electronic device 100 may output red light with a brightness of 50. The external lighting device (e.g., IoT device) may directly or indirectly transmit the lighting information (e.g., information indicating that the red light is output with the brightness of 50) to the electronic device 100. Here, the electronic device 100 may control the output of the light source based on the lighting information received from the external lighting device. For example, the electronic device 100 may output the red light with the brightness of 50 in case that the lighting information received from the external lighting device includes the information indicating that the red light is output with the brightness of 50.

Meanwhile, the electronic device 100 may control the lighting function based on biometric information. In detail, the processor 111 may acquire the user's biometric information. Here, the biometric information may include at least one of the user's body temperature, heart rate, blood pressure, respiration, or electrocardiogram. Here, the biometric information may include various information other than the above-mentioned information. For example, the electronic device 100 may include a sensor for measuring the biometric information. The processor 111 may acquire the user's biometric information through the sensor and control the output of the light source based on the acquired biometric information. For another example, the processor 111 may receive the biometric information from the external device through the input/output interface 116. Here, the external device may be the portable communication device (e.g., smart phone or wearable device) of the user. The processor 111 may acquire the user's biometric information from the external device and control the output of the light source based on the acquired biometric information. Meanwhile, in an implementation example, the electronic device 100 may identify whether the user is sleeping and the processor 111 may control the output of the light source based on the user's biometric information in case that it is identified that the user is sleeping (or preparing to sleep).

Meanwhile, the electronic device 100 according to the various example embodiments may provide various smart functions.

In detail, the electronic device 100 may be connected to a portable terminal device controlling the electronic device 100, and a screen output from the electronic device 100 may be controlled by the user input that is input from the portable terminal device. For example, the portable terminal device may be implemented as a smartphone including a touch display, the electronic device 100 may receive screen data provided by the portable terminal device from the portable terminal device and output the data, and the screen output by the electronic device 100 may be controlled based on the user input that is input from the portable terminal device.

The electronic device 100 may be connected to the portable terminal device by using various communication methods such as miracast, airplay, wireless dalvik executable (DEX) and a remote personal computer (PC) method, and may share a content or music, provided by the portable terminal device.

In addition, the portable terminal device and the electronic device 100 may be connected to each other by various connection methods. According to the various embodiments, the portable terminal device may search for the electronic device 100 and perform a wireless connection, or the electronic device 100 may search for the portable terminal device and perform the wireless connection. In addition, the electronic device 100 may output the content provided by the portable terminal device.

According to the various embodiments, the electronic device 100 may output a content or music being output from the portable terminal device in case that the portable terminal device is positioned near the electronic device 100, and a predetermined gesture (e.g., motion tap view) is then detected by display of the portable terminal device in a state where the specific content or music is being output from the portable terminal device.

According to the various embodiments, the electronic device 100 may output the content or music being output from the portable terminal device in case that the portable terminal device is positioned around the electronic device 100 by a predetermined distance or less (e.g., non-contact tap view), or the portable terminal device touches the electronic device 100 twice at short intervals (e.g., contact tap view) in the state where the specific content or music is being output from the portable terminal device.

The above embodiment describes that the screen provided by the portable terminal device is the same as the screen provided by the electronic device 100. However, the disclosure is not limited thereto. That is, in case that the portable terminal device and the electronic device 100 are connected to each other, the portable terminal device may output a first screen provided by the portable terminal device, and the electronic device 100 may output a second screen provided by the portable terminal device, which is different from the first screen. For example, the first screen may be a screen provided by a first application installed on the portable terminal device, and the second screen may be a screen provided by a second application installed on the portable terminal device. For example, the first screen and the second screen may be different screens provided by one application installed on the portable terminal device. In addition, for example, the first screen may be a screen including the UI in a remote controller form for controlling the second screen.

The electronic device 100 may output a standby screen. For example, the electronic device 100 may output the standby screen in case that the electronic device 100 and the external device are not connected to each other or in case that there is no input received from the external device for a predetermined time. A condition for the electronic device 100 to output the standby screen is not limited to the above-described embodiment, and the standby screen may be output based on various conditions.

The electronic device 100 may output the standby screen in the form of a blue screen, and the disclosure is not limited thereto. For example, the electronic device 100 may acquire an atypical object by extracting only a shape of a specific object from the data received from the external device, and output the standby screen including the acquired atypical object.

Meanwhile, the electronic device 100 may further include a display (not shown).

The display (not shown) may be implemented as various types of displays such as a liquid crystal display (LCD), an organic light emitting diode (OLED) display, a plasma display panel (PDP), and the like. The display (not shown) may include a driving circuit, a backlight unit, and the like, which may be implemented in a form such as an amorphous silicon thin film transistor (a-si TFT), a low temperature poly silicon (LTPS) TFT, or an organic TFT (OTFT). Meanwhile, the display (not shown) may be implemented as a touch screen combined with a touch sensor, a flexible display, a three-dimensional (3D) display, or the like. In addition, the display (not shown) according to the various example embodiments may include not only a display panel outputting the image, but also a bezel housing the display panel. In particular, the bezel according to the various example embodiments may include a touch sensor (not shown) detecting user interaction.

Meanwhile, the electronic device 100 may further include a shutter part (not shown).

The shutter part (not shown) may include at least one of a shutter, a fixing member, a rail, or a body.

Here, the shutter may block light output from the projection part 112. Here, the fixing member may fix a position of the shutter. Here, the rail may be a path to move the shutter or the fixing member. Here, the body may be a component including the shutter and the fixing member.

Figure 20:
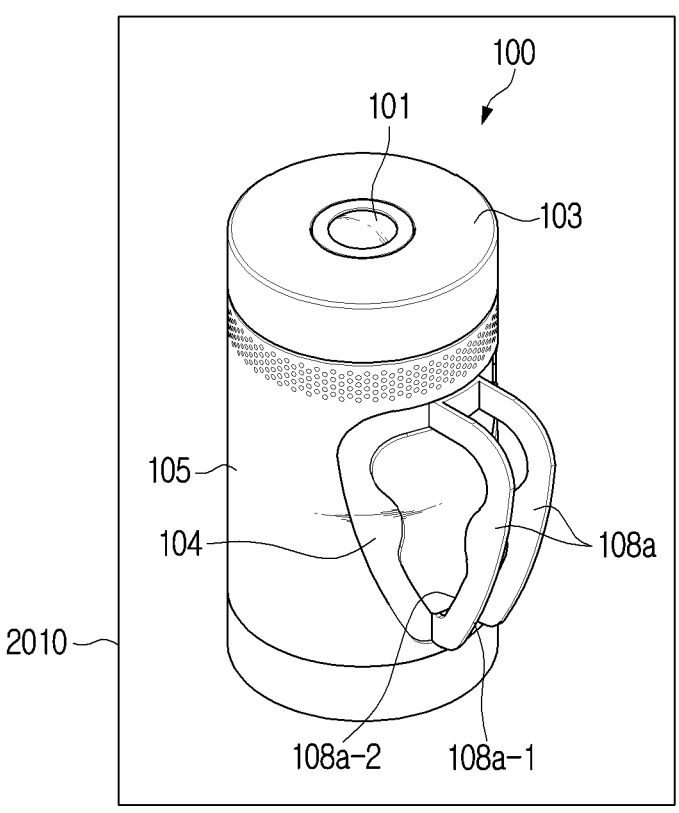
FIGS. 20 to 26 are perspective views each showing an appearance of the second electronic device according to one or more example embodiments.
Figure 20:
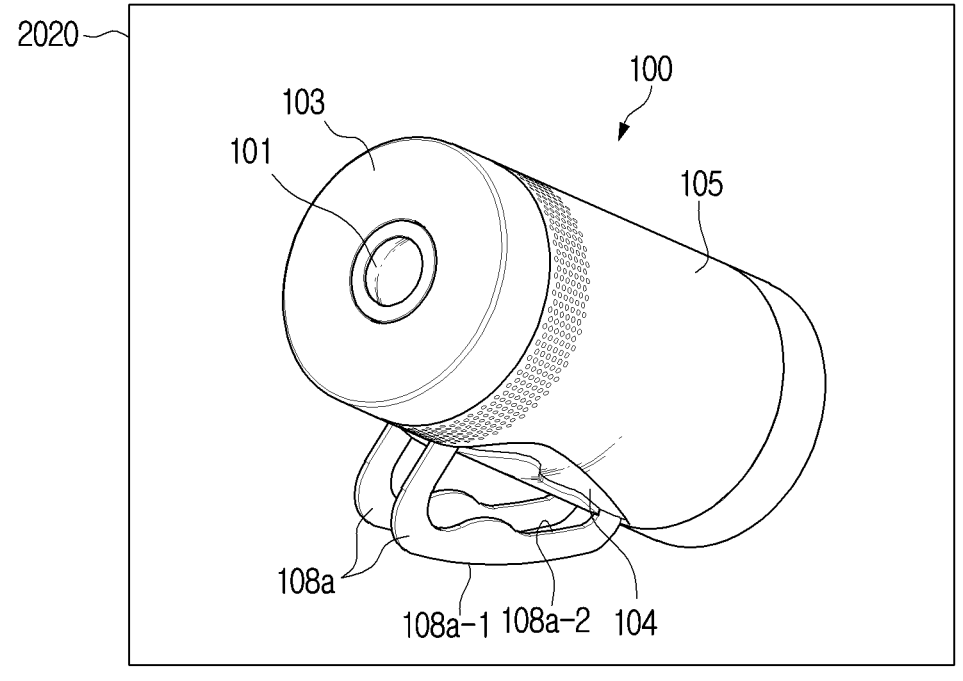

FIG. 20 is a perspective view showing an appearance of the electronic device 100 according to various embodiments.

Referring to an embodiment 2010 of FIG. 20, the electronic device 100 may include the support (or the "handle") 108*a*.

The support 108*a* in the various embodiments may be the handle or a ring that is provided for the user to grip or move the electronic device 100. Alternatively, the support 108*a* may be a stand that supports the body 105 while the body 105 is laid down in the lateral direction.

The support 108*a* may be connected, directly or indirectly, to the outer circumferential surface of the body 105 in a hinge structure to be coupled to or separated therefrom, and selectively separated from or fixed to the outer circumferential surface of the body 105 based on a user need. The number, shape, or disposition structure of the support 108*a* may be implemented in various ways without restriction. Although not shown in the drawings, the support 108*a* may be embedded in the body 105, and taken out and used by the user based on the user need. Alternatively, the support 108*a* may be implemented as a separate accessory, and detached from the electronic device 100.

The support 108*a* may include a first support surface 108*a*-1 and a second support surface 108*a*-2. The first support surface 108*a*-1 may be a surface of the support 108*a* that faces the outside of the body 105 in a state where the support 108*a* is separated from the outer circumferential surface of the body 105, and the second support surface 108*a*-2 may be a surface of the support 108*a* that faces the inside of the body 105 in a state where the support 108*a* is separated from the outer circumferential surface of the body 105.

The first support surface 108*a*-1 may be developed from the lower portion to upper portion of the body 105 while being farther away from the body 105, and the first support surface 108*a*-1 may have a flat or uniformly curved shape. The first support surface 108*a*-1 may support the body 105 in case that the electronic device 100 is held in such a manner that an outer surface of the body 105 is in contact with its bottom surface, e.g., in case that the projection lens 101 disposed to face the front. In an embodiment in which the electronic device 100 includes two or more supports 108*a*, the head 103 and the projection angle of the projection lens 101 may be adjusted by adjusting a distance or hinge open angle between the two supports 108*a*.

The second support surface 108*a*-2 may be a surface of the support 108*a* that is touched by the user or in contact with an external holding structure if the support 108*a* is supported by the user or the external holding structure, and may have a shape corresponding to a gripping structure of the user's hand or the external holding structure for the electronic device 100 not to slip in case that the electronic device 100 is supported or moved. The user may move the electronic device 100 by making the projection lens 101 face toward the front, fixing the head 103 and holding the support 108*a*, and use the electronic device 100 like a flashlight.

A support groove 104 may be a groove structure which is provided in the body 105 and accommodates the support 108*a* in case that the support 108*a* is not used, and may be implemented as a groove structure corresponding to the shape of the support 108*a* and positioned in the outer circumferential surface of the body 105. By using the support groove 104, the support 108*a* may be stored on the outer circumferential surface of the body 105 in case that the support 108*a* is not used, and the outer circumferential surface of the body 105 may be maintained to be slick.

Alternatively, the support 108*a* may be stored inside the body 105, and may be taken out to the outside of the body 105 in a situation where the support 108*a* is needed. In this case, the support groove 104 may be led into the inside of the body 105 to accommodate the support 108*a*, and the second support surface 108*a*-2 may have a door (not shown) that adheres to the outer circumferential surface of the body 105 or opens or closes the separate support groove 104.

Although not shown in the drawings, the electronic device 100 may include various kinds of accessories that are helpful in using or storing the electronic device 100. For example, the electronic device 100 may include a protection case (not shown) for the electronic device 100 to be easily carried while being protected. Alternatively, the electronic device 100 may include a tripod (not shown) that supports or fixes the body 105, or a bracket (not shown) that may be coupled to the outer surface of the electronic device and fix the electronic device 100.

An embodiment 2020 of FIG. 20 shows a state where the electronic device 100 of the embodiment 2010 is held to be in contact with the bottom surface.

Figure 21:
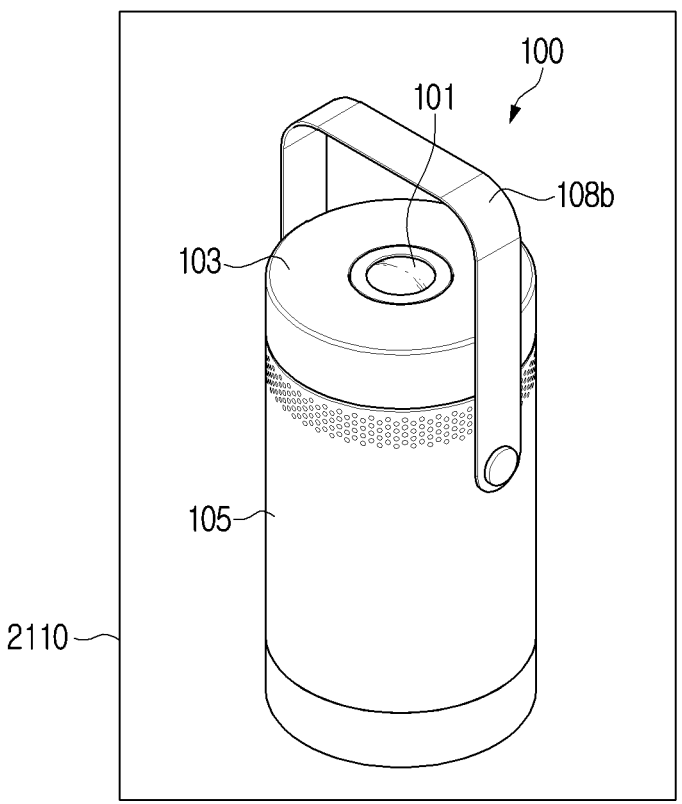
Figure 21:
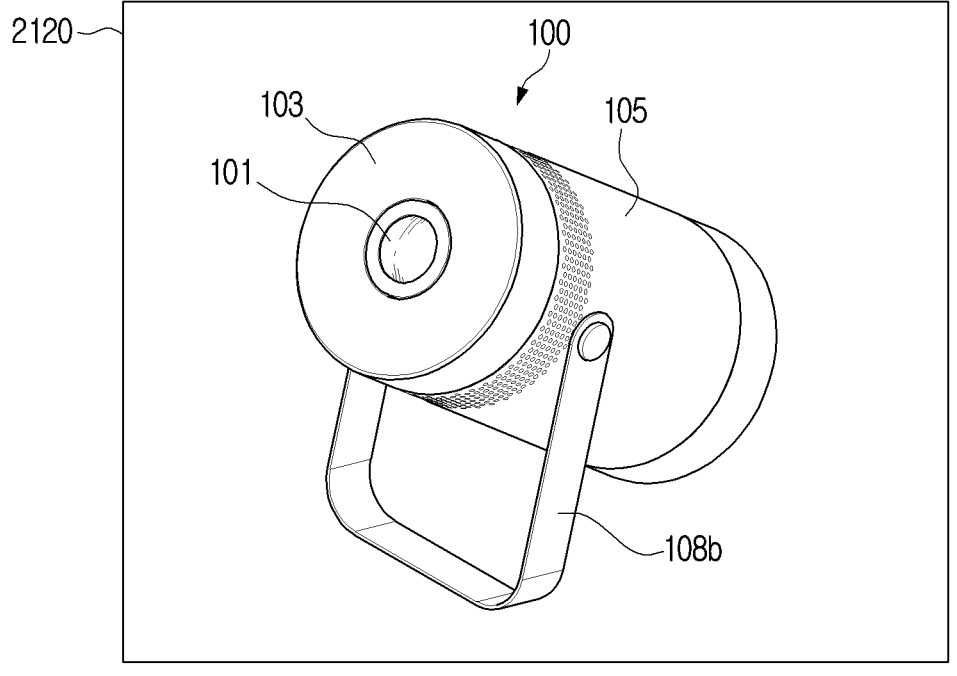

FIG. 21 is a perspective view showing an appearance of the electronic device 100 according to various embodiments.

Referring to an embodiment 2110 of FIG. 21, the electronic device 100 may include a support (or a "handle") 108*b*.

The support 108*b* in the various embodiments may be the handle or a ring that is provided for the user to grip or move the electronic device 100. Alternatively, the support 108*b* may be a stand that supports the body 105 to be toward any angle while the body 105 is laid down in the lateral direction.

In detail, the support 108*b* may be connected, directly or indirectly, to the body 105 at a predetermined point (e.g., ⅔ to ¾ point of a body height) of the body 105. In case that the support 108*b* is rotated toward the body, the support 108*b* may support the body 105 for the body 105 to be toward any angle while the body 105 is laid down in the lateral direction.

An embodiment 2120 of FIG. 21 shows a state where the electronic device 100 of the embodiment 2110 is held to be in contact with the bottom surface.

Figure 22:
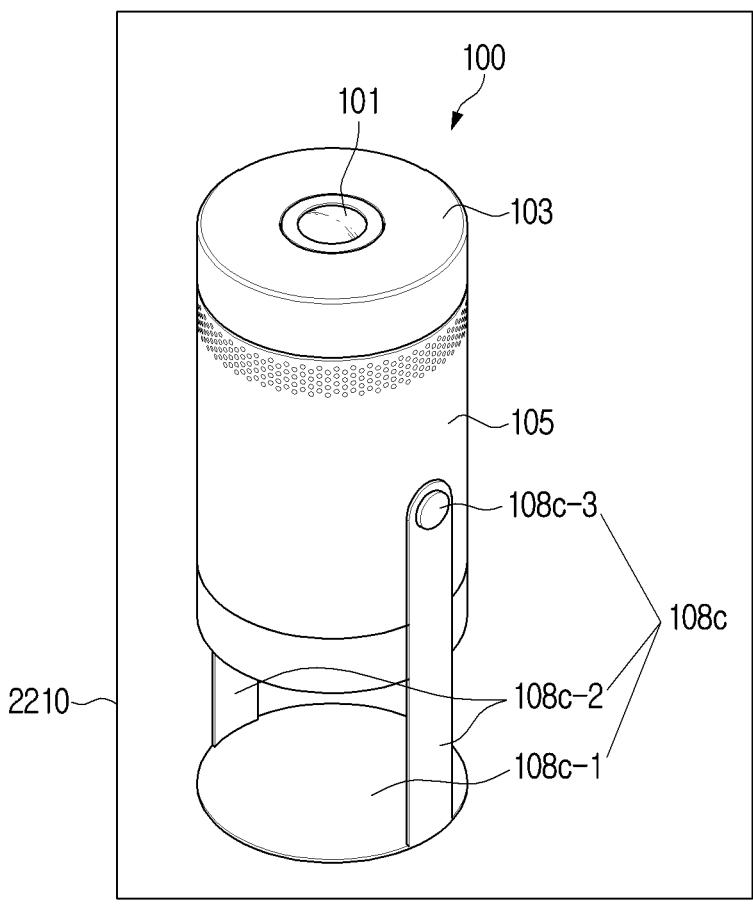
Figure 22:
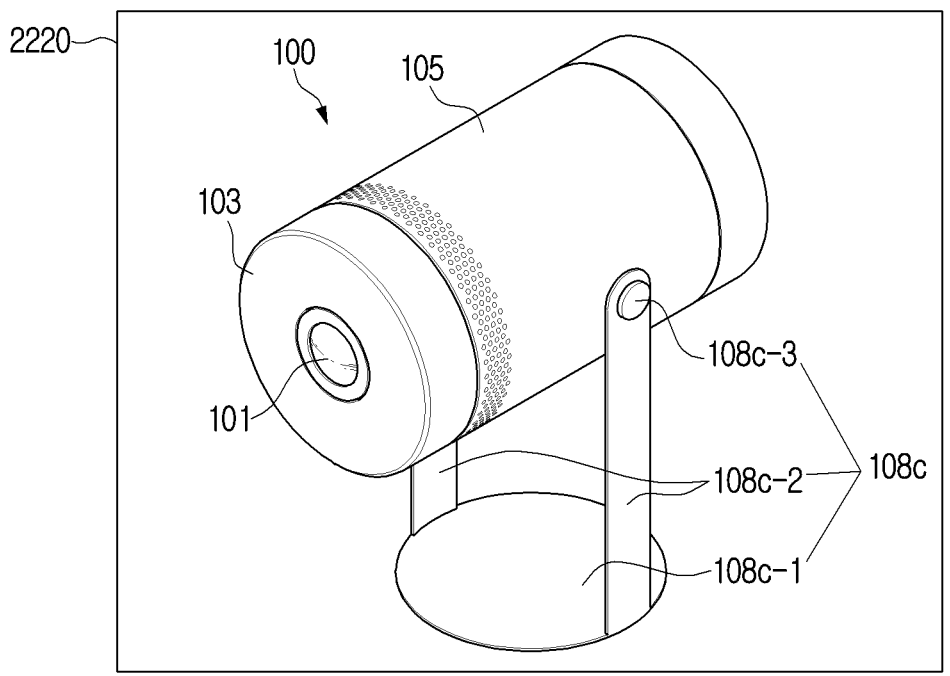

FIG. 22 is a perspective view showing an appearance of the electronic device 100 according to various embodiments.

Referring to an embodiment 2210 of FIG. 22, the electronic device 100 may include a support (or a "stand") 108*c*.

The support 108*c* in the various embodiments may include a base plate 108*c*-1 provided to support the electronic device 100 on the ground and two support members 108*c*-2. Here, the two support members 108*c*-2 may connect the base plate 108*c*-1 and the body 105.

According to the various example embodiments, the two support members 108*c*-2 may have the same height, and cross sections of the two support members 108*c*-2 may be coupled to or separated from each other by a groove and a hinge member 108*c*-3, positioned on one outer circumferential surface of the body 105.

The two support members may be hinge-coupled to the body 105 at a predetermined point (e.g., ⅓ to ¾ point of the height of the body) of the body 105.

In case that the two support members and the body are coupled with each other by the hinge member 108*c*-3, the body 105 may be rotated based on a virtual horizontal axis formed by the two hinge members 108*c*-3, thus adjusting the projection angle of the projection lens 101.

An embodiment 2220 of FIG. 22 shows a state where the electronic device 100 of the embodiment 2210 is rotated.

Figure 23:
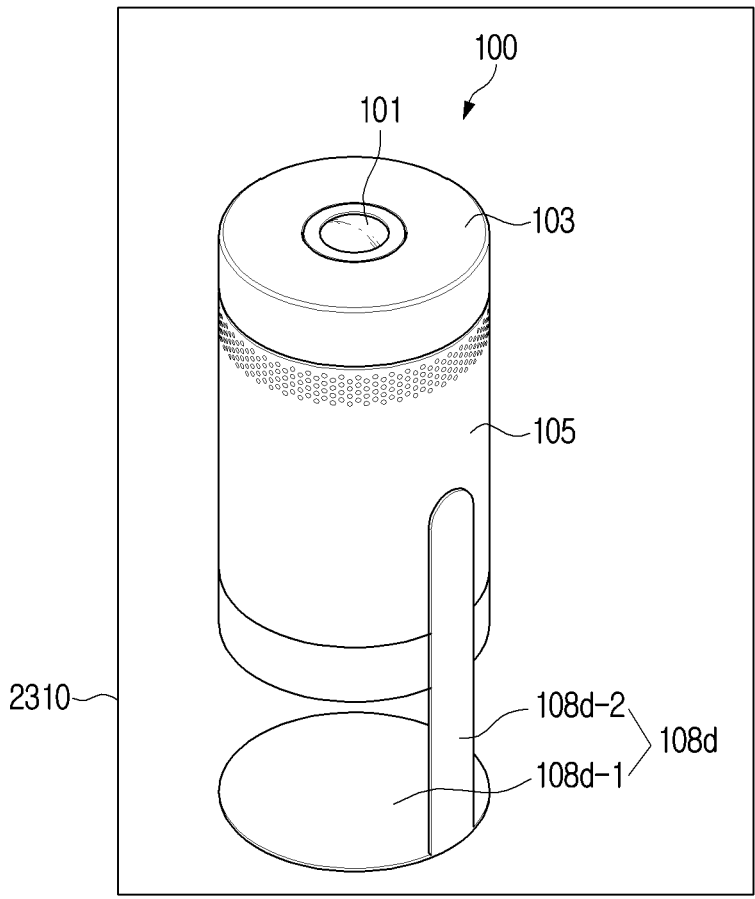
Figure 23:
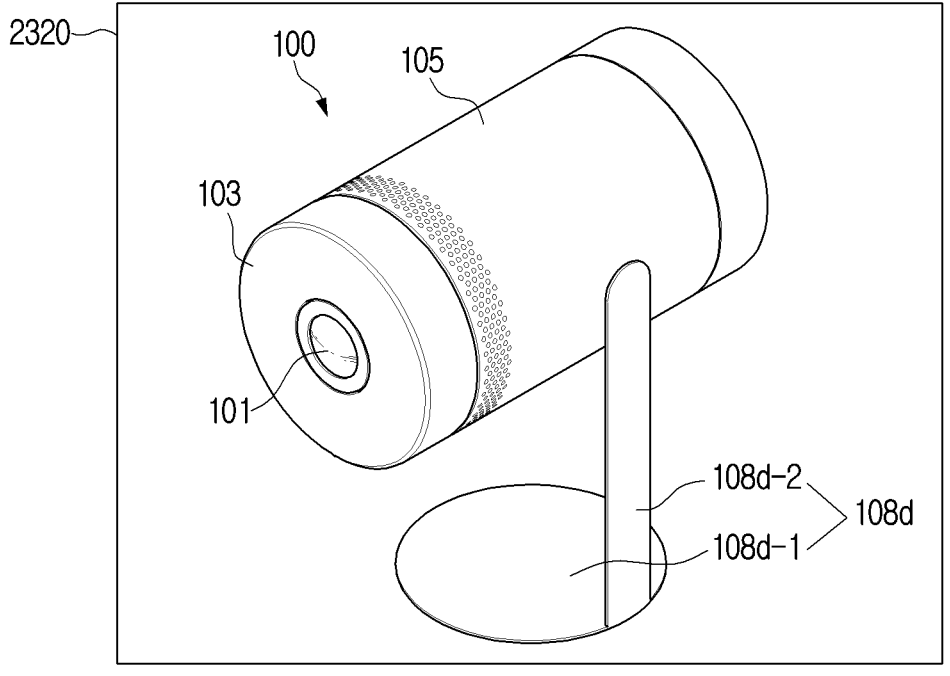

FIG. 22 shows an embodiment in which the two support members 108*c*-2 are connected, directly or indirectly, with the body 105, the disclosure is not limited thereto, and as shown in FIG. 23, one support member and the body 105 may be connected, directly or indirectly, with each other by one hinge member.

FIG. 23 is a perspective view showing an appearance of the electronic device 100 according to various embodiments.

Referring to an embodiment 2310 of FIG. 23, the electronic device 100 may include a support (or a "stand") 108*d*.

The support 108d in the various embodiments may include a base plate 108*d*-1 provided to support the electronic device 100 on the ground and one support member 108*d*-2 connecting the base plate 108*d*-1 with the body 105.

In addition, a cross section of one support member 108*d*-2 may be coupled to or separated from the body by a groove and a hinge member (not shown), provided on one outer circumferential surface of the body 105.

In case that one support member 108*d*-2 and the body 105 are coupled with each other by one hinge member (not shown), the body 105 may be rotated based on a virtual horizontal axis formed by one hinge member (not shown).

An embodiment 2320 of FIG. 23 shows a state where the electronic device 100 of the embodiment 2310 is rotated.

Figure 24:
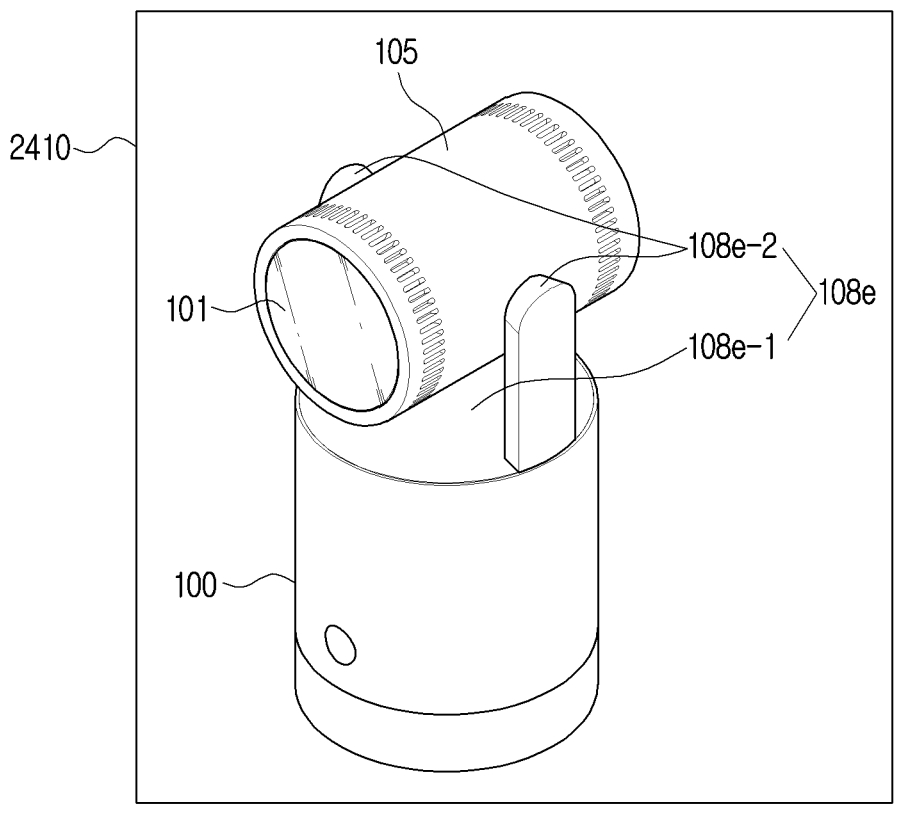
Figure 24:
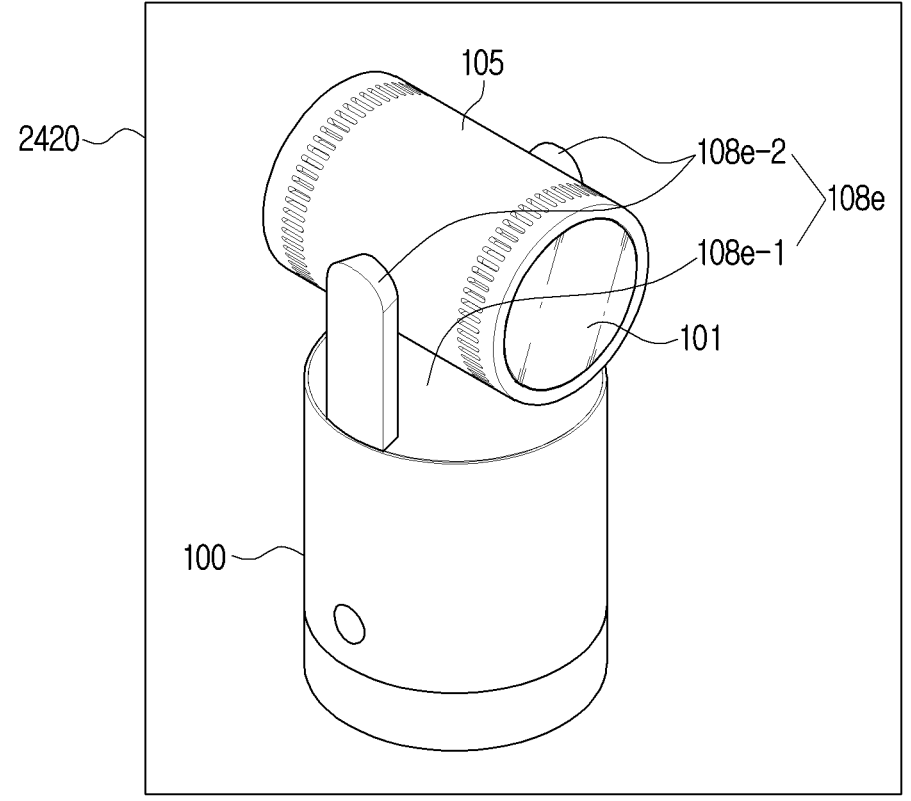

FIG. 24 is a perspective view showing an appearance of the electronic device 100 according to various embodiments.

Referring to an embodiment 2410 of FIG. 24, the electronic device 100 may include a support (or a "stand") 108*e*.

The support 108e in the various embodiments may include a base plate 108*e*-1 provided to support the electronic device 100 on the ground and two support members 108*e*-2. Here, the two support members 108*e*-2 may connect the base plate 108*e*-1 and the body 105.

According to the various example embodiments, the two support members 108*e*-2 may have the same height, and cross sections of the two support members 108*e*-2 may be coupled to or separated from each other by a groove and a hinge member (not shown), positioned on one outer circumferential surface of the body 105.

The two support members may be hinge-coupled to the body 105 at a predetermined point (e.g., ⅓ to ¾ point of the height of the body) of the body 105.

In case that the two support members and the body are coupled with each other by the hinge member (not shown), the body 105 may be rotated based on a virtual horizontal axis formed by the two hinge members (not shown), thus adjusting the projection angle of the projection lens 101.

Meanwhile, the electronic device 100 may rotate the body 105 including the projection lens 101. The body 105 and the support 108e may be rotated based on a virtual vertical axis at the center point of the base plate 108*e*-1.

An embodiment 2420 of FIG. 24 shows a state where the electronic device 100 of the embodiment 2410 is rotated.

Meanwhile, the support shown in FIG. 20, 21, 22, 23, or 24 is only one of the various embodiments, and the electronic device 100 may include the support in various positions or shapes.

Figure 25:
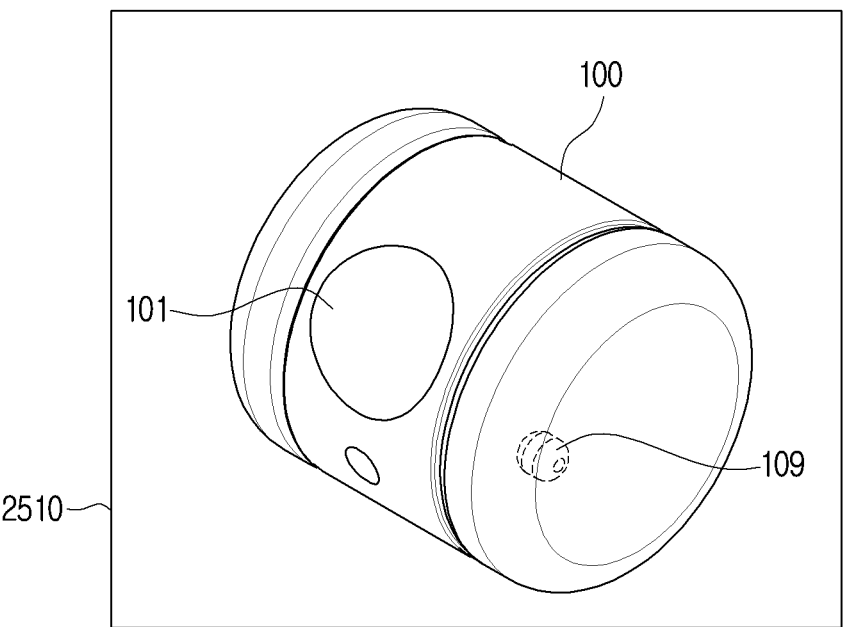
Figure 25:
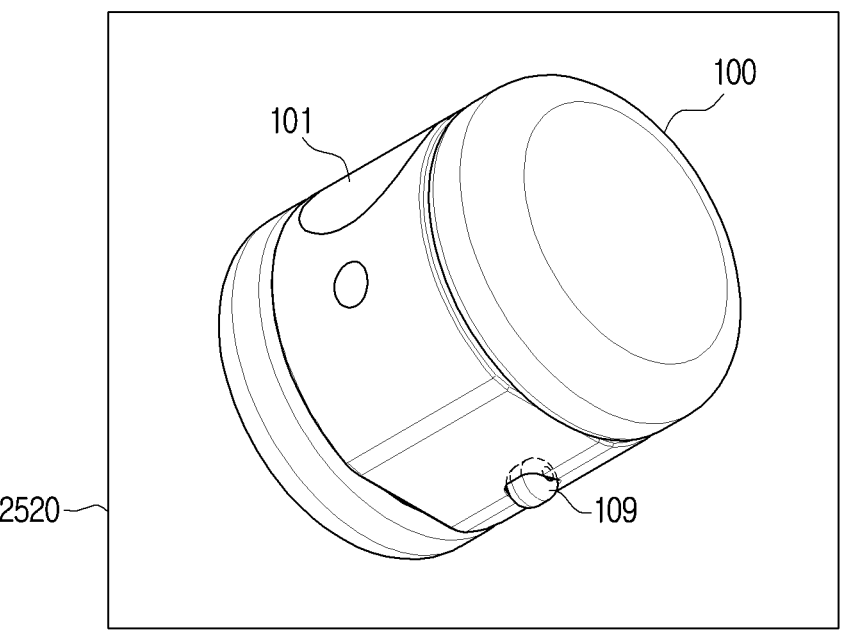

FIG. 25 is a perspective view showing an appearance of the electronic device 100 according to various embodiments.

Referring to an embodiment 2510 of FIG. 25, the electronic device 100 may include the moving member 109. The moving member 109 may refer to a member moving from a first position to a second position in a space where the electronic device 100 is disposed. The electronic device 100 may control the moving member 109 by using a force generated by the drive part 120 for the electronic device 100 to be moved.

An embodiment 2520 of FIG. 25 is a view of the electronic device 100 of the embodiment 2510 viewed from a different direction.

Figure 26:
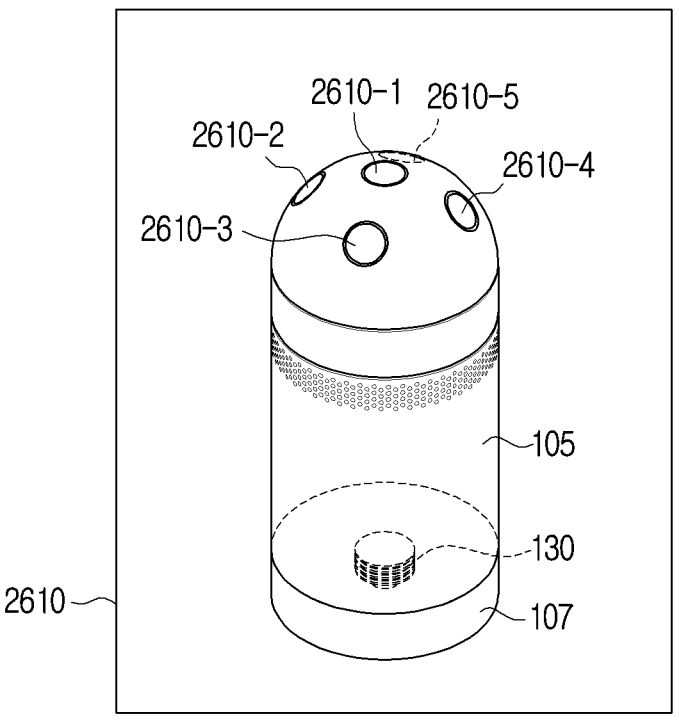
Figure 26:
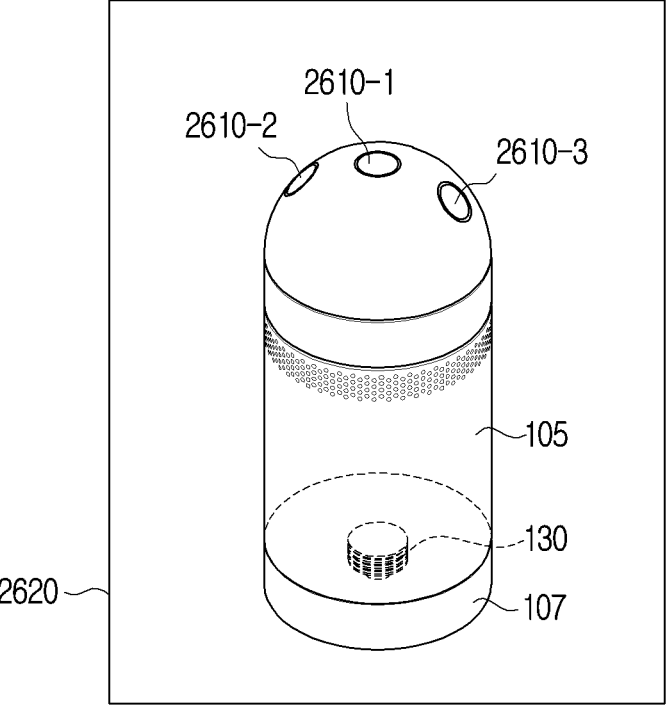

FIG. 26 is a perspective view showing an appearance of the electronic device 100 according to various embodiments.

In detail, the electronic device 100 may include a plurality of projection lenses to project not only light in the front direction but also light in the lateral direction to the head 103.

Referring to an embodiment 2610 of FIG. 26, the electronic device 100 may include not only a first projection lens 2610-1 positioned on the head 103 and projecting light in the front direction, but also second to fifth projection lenses 2610-2 to 2610-5 positioned on the head 103 and projecting light in the plurality of lateral directions. In this way, the electronic device 100 may project the multi-sided image to five projection surfaces by using the plurality of projection lenses 2610-1 to 2610-5. Here, as shown in FIG. 3B, the electronic device 100 may include the split prism 360 including the hole positioned in its central region and four inclined surfaces.

Each embodiment herein may be used in combination with any other embodiment(s) described herein.

Referring to an embodiment 2620 of FIG. 26, the electronic device 100 may include not only a first projection lens 2610-1 positioned on the head 103 and projecting light in the front direction, but also second and third projection lenses 2610-2 and 2610-3 positioned on the head 103 and projecting light in the plurality of lateral directions. In this way, the electronic device 100 may project the multi-sided image to three projection surfaces by using the plurality of projection lenses 2610-1 to 2610-3. Here, as shown in FIG. 11A, the electronic device 100 may include the split prism 360 including the hole positioned in its central region and two inclined surfaces.

Meanwhile, the method according to the various embodiments may be provided by being included in a computer program product. The computer program product may be traded as a product between a seller and a purchaser. The computer program product may be distributed in the form of a storage medium (for example, a compact disc read only memory (CD-ROM)) that may be read by a machine, or may be distributed online (for example, downloaded or uploaded) through an application store (for example, PlayStore™) or directly between two user devices (for example, smartphones). In case of the online distribution, at least a part of the computer program product (e.g., downloadable app) may be at least temporarily stored or temporarily provided in the machine-readable storage medium such as a server memory of a manufacturer, a server memory of an application store, or a relay server memory.

The method according to the various example embodiments may be implemented in software including an instruction stored in the machine-readable storage medium (for example, the computer-readable storage medium). The machine may be a device that invokes the stored instruction from the storage medium and may operate based on the invoked instruction, and may include the electronic device (for example, a television) according to the disclosed embodiments.

Meanwhile, the machine-readable storage medium may be provided in the form of a non-transitory storage medium. Here, the "non-transitory storage medium" may refer to a tangible device and only indicate that this storage medium does not include a signal (e.g., an electromagnetic wave), and this term does not distinguish a case where data is semi-permanently stored in the storage medium and a case where data is temporarily stored in the storage medium from each other. For example, the "non-transitory storage medium" may include a buffer in which data is temporarily stored.

In case that the instruction is executed by the processor, the processor may directly perform a function corresponding to the instruction or other components may perform the function corresponding to the instruction under a control of the processor. The instruction may include codes provided or executed by a compiler or an interpreter.

Although the embodiments are shown and described in the disclosure as above, the disclosure is not limited to the above mentioned specific embodiments, and may be variously modified by those skilled in the art to which the disclosure pertains without departing from the gist of the disclosure as disclosed in the accompanying claims. These modifications should also be understood to fall within the scope and spirit of the disclosure. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a projection part;
   a memory storing at least one instruction; and
   at least one processor,
   wherein the projection part includes a split prism and is configured for transmitting a part of light emitted from a light source in a front direction and reflecting a remaining part of light on at least one inclined surface in a lateral direction, and
   wherein the at least one processor is configured to:
   convert an image into a multi-sided image to be projected to a plurality of projection surfaces, and
   control the projection part to project the converted multi-sided image to the plurality of projection surfaces via the split prism,
   wherein the split prism includes:
   a hole positioned in its central region configured to transmit a part of light in the front direction, and
   a plurality of inclined surfaces positioned in a plurality of lateral direction of the hole for reflecting a part of the light in respective lateral directions.

2. The device as claimed in claim 1, wherein the plurality of inclined surfaces includes:
   a first inclined surface positioned in a first lateral direction of the hole for reflecting a part of light in the first lateral direction,
   a second inclined surface positioned in a second lateral direction of the hole for reflecting a part of light in the second lateral direction,
   a third inclined surface positioned in a third lateral direction of the hole for reflecting a part of light in the third lateral direction, and
   a fourth inclined surface positioned in a fourth lateral direction of the hole for reflecting a part of light in the fourth lateral direction.

3. The device as claimed in claim 2, wherein the at least one processor is configured to:

segment the image, corresponding to a received signal, into a front region and first, second, third, and fourth lateral regions respectively corresponding to the first, second, third, and fourth lateral directions, convert the front region and the first, second, third, and fourth lateral regions respectively into a front image and first, second, third, and fourth lateral images by using at least one conversion matrix, and acquire the multi-sided image including the front image and the first, second, third, and fourth lateral images.

4. The device as claimed in claim 3, wherein the at least one processor is configured to:

acquire at least one of: information on the image corresponding to the received signal, information on another image, or real-time environment information, segment the image corresponding to the received signal into the front region and at least one lateral region corresponding to at least one of the first, second, third, and fourth lateral directions, convert the front region and the at least one lateral region respectively into the front image and at least one lateral image by using the at least one conversion matrix, generate one or more lateral images corresponding to at least one remaining direction among the first, second, third, and fourth lateral directions based on at least one of the information on the image corresponding to the received signal, the information on another image, or the real-time environment information, and acquire the multi-sided image including the front image, the at least one lateral image, and one or more lateral images.

5. The device as claimed in claim 4, wherein the at least one processor is configured so that a type and/or display position of an image displayed on the one or more lateral image can be changed by a user input.

6. The device as claimed in claim 1, wherein the at least one processor is configured so that the electronic device can operate in at least one of: a first projection mode of projecting the image, corresponding to a received signal, to the projection surface in the front direction, and a second projection mode of converting the image corresponding to the received signal into the multi-sided image and projecting the multi-sided image to the plurality of projection surfaces.

7. The device as claimed in claim 6, wherein the projection part further includes a liquid crystal lens disposed between at least a prism through which light reflected by a digital micromirror device (DMD) passes and the split prism, and wherein the at least one processor is configured to operate in one of the first projection mode and the second projection mode by applying a voltage to the liquid crystal lens to adjust a focal length of the liquid crystal lens.

8. The device as claimed in claim 1, further comprising a sensor, wherein the at least one processor is configured to:

acquire information on a distance between the projection surface and the electronic device based on a sensing value acquired by the sensor, and adjust sizes of a plurality of images included in the multi-sided image and/or perform keystone correction based on the information on the distance between the projection surface and the electronic device.

9. The device as claimed in claim 1, wherein comprising a sensor, and wherein the at least one processor is configured to:

acquire information on at least one of a user position, a position of the electronic device, or a type of projection surface based on a sensing value acquired by the sensor, and determine an image segmentation type based on the information on at least one of the user position, the position of the electronic device, or the type of projection surface.

10. An electronic device comprising:

a projection part;

a memory storing at least one instruction;

at least one processor, wherein the projection part includes a split prism and is configured for transmitting a part of light emitted from a light source in a front direction and reflecting a remaining part of light on at least one inclined surface in a lateral direction; and a sensor, wherein the at least one processor is configured to:

acquire information on at least one of a user position, a position of the electronic device, or a type of projection surface based on a sensing value acquired by the sensor, determine an image segmentation type based on the information on at least one of the user position, the position of the electronic device, or the type of projection surface, convert an image into a multi-sided image to be projected to a plurality of projection surfaces based at least in part on the determined image segmentation type, and control the projection part to project the converted multi-sided image to the plurality of projection surfaces via the split prism.

11. The device as claimed in claim 10, wherein the split prism includes:

a hole positioned in its central region to transmit a part of light in the front direction, a first inclined surface positioned in a first lateral direction of the hole and reflecting a part of light in the first lateral direction, a second inclined surface positioned in a second lateral direction of the hole and reflecting a part of light in the second lateral direction, a third inclined surface positioned in a third lateral direction of the hole and reflecting a part of light in the third lateral direction, and a fourth inclined surface positioned in a fourth lateral direction of the hole and reflecting a part of light in the fourth lateral direction, wherein the at least one processor is configured to:

segment the image, corresponding to a received signal, into a front region and first, second, third, and fourth lateral regions respectively corresponding to the first, second, third, and fourth lateral directions, convert the front region and the first, second, third, and fourth lateral regions respectively into a front image and first, second, third, and fourth lateral images by using at least one conversion matrix, and acquire the multi-sided image including the front image and the first, second, third, and fourth lateral images.

12. The device as claimed in claim 10, further comprising a sensor, wherein the at least one processor is configured to:

acquire information on a distance between the projection surface and the electronic device based on a sensing value acquired by the sensor, and adjust sizes of a plurality of images included in the multi-sided image and/or perform keystone correction based on the information on the distance between the projection surface and the electronic device.

13. A controlling method of an electronic device which includes a projection part, the projection part including a split prism for transmitting a part of light emitted from a light source in a front direction and reflecting a remaining part of light on at least one inclined surface in a lateral direction, the method comprising:

converting an image corresponding to a received signal into a multi-sided image to be projected to a plurality of projection surfaces; and projecting the converted multi-sided image to the plurality of projection surfaces through the split prism, wherein the split prism includes:

a hole positioned in its central region to transmit a part of light in the front direction, and a plurality of inclined surfaces positioned in a plurality of lateral direction of the hole for reflecting a part of the light in respective lateral directions.

14. The method as claimed in claim 13, wherein the plurality of inclined surfaces includes:

a first inclined surface positioned in a first lateral direction of the hole and reflecting a part of light in the first lateral direction, a second inclined surface positioned in a second lateral direction of the hole and reflecting a part of light in the second lateral direction, a third inclined surface positioned in a third lateral direction of the hole and reflecting a part of light in the third lateral direction, and a fourth inclined surface positioned in a fourth lateral direction of the hole and reflecting a part of light in the fourth lateral direction.

15. The method as claimed in claim 14, wherein the converting includes:

segmenting the image corresponding to the received signal into a front region and first, second, third, and fourth lateral regions respectively corresponding to the first, second, third, and fourth lateral directions;

converting the front region and the first, second, third, and fourth lateral regions respectively into a front image and first, second, third, and fourth lateral images based on at least one conversion matrix; and acquiring the multi-sided image including the front image and the first, second, third, and fourth lateral images.

16. The method as claimed in claim 15, further comprising acquiring at least one of information on the image corresponding to the received signal, information on another image, or real-time environment information, wherein the converting includes:

segmenting the image corresponding to the received signal into the front region and at least one lateral region corresponding to at least one of the first, second, third, and fourth lateral directions;

converting the front region and the at least one lateral region respectively into the front image and at least one lateral image by using the at least one conversion matrix;

generating one or more lateral images corresponding to at least one remaining direction among the first, second, third, and fourth lateral directions based on at least one of the information on the image corresponding to the received signal, the information on another image, or the real-time environment information; and acquiring the multi-sided image including the front image, the at least one lateral image and one or more lateral images.

17. The method as claimed in claim 16, wherein a type and/or display position of an image displayed via the one or more lateral images is changed based on a user input.

18. The method as claimed in claim 13, further comprising operating in at least one of a first projection mode of projecting the image corresponding to the received signal to the projection surface in the front direction, and a second projection mode of converting the image corresponding to the received signal into the multi-sided image and projecting the multi-sided image to the plurality of projection surfaces.

19. The method as claimed in claim 13, comprising:

acquiring information on at least one of a user position, a position of the electronic device, or a type of projection surface based on a sensing value acquired by a sensor; and determining an image segmentation type based on the information on at least one of the user position, the position of the electronic device, or the type of projection surface, where the image is converted into the multi-sided image based on the determined image segmentation type.

* * * * *